United States Patent
Girardier et al.

(10) Patent No.: US 11,039,411 B2
(45) Date of Patent: *Jun. 15, 2021

(54) SYNCHRONIZATION METHOD FOR SYNCHRONIZING CLOCKS OF A BLUETOOTH DEVICE

(71) Applicant: TAP SOUND SYSTEM SAS, Fontenay-sous-Bois (FR)

(72) Inventors: Thomas Girardier, Bourg la Reine (FR); Matthieu Guesnerot, Paris (FR); William Escande, Balma (FR)

(73) Assignee: TAP SOUND SYSTEM, Fontenay-sous-Bois (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/923,677

(22) Filed: Jul. 8, 2020

(65) Prior Publication Data

US 2020/0337003 A1 Oct. 22, 2020

Related U.S. Application Data

(63) Continuation of application No. 16/176,174, filed on Oct. 31, 2018, now Pat. No. 10,750,459.

(30) Foreign Application Priority Data

Oct. 26, 2018 (EP) ..................................... 18306402

(51) Int. Cl.
*H04J 3/06* (2006.01)
*H04W 56/00* (2009.01)
*H04W 4/80* (2018.01)

(52) U.S. Cl.
CPC ........... *H04W 56/001* (2013.01); *H04W 4/80* (2018.02)

(58) Field of Classification Search
CPC .... H04W 56/001; H04W 4/80; H04W 56/002
USPC ......................................................... 370/350
See application file for complete search history.

(56) References Cited

U.S. PATENT DOCUMENTS

| | | |
|---|---|---|
| 8,102,836 B2 | 1/2012 | Jerlhagen |
| 8,320,410 B2 | 11/2012 | Agren |
| 2002/0136198 A1* | 9/2002 | Findikli ................ H04J 3/0685 370/350 |

(Continued)

OTHER PUBLICATIONS

Extended European Search Report dated Apr. 18, 2019 from European Application No. 18306402.1 filed Oct. 26, 2018, 4 pages.

(Continued)

*Primary Examiner* — Mang Hang Yeung
(74) *Attorney, Agent, or Firm* — Daylight Law, P.C.

(57) ABSTRACT

A Bluetooth device with a host system and a controller is disclosed. The host system supports a host stack of a Bluetooth protocol, and the controller supports a controller stack of the Bluetooth protocol. The device includes an interface for receiving, at the controller, a piconet-synchronized signal. The device also includes an interface for providing, by the controller to the host system, a derivative of the piconet-synchronized signal. The device also includes a circuit for determining a latency of the providing. The device also includes a circuit for synchronizing, at the host system of the Bluetooth device, a host clock with a timing reference of a master device of the Bluetooth piconet using said latency and the derivative of the piconet-synchronized signal.

32 Claims, 11 Drawing Sheets

(56) References Cited

U.S. PATENT DOCUMENTS

| | | |
|---|---|---|
| 2008/0226094 A1 | 9/2008 | Rutschman |
| 2008/0291863 A1* | 11/2008 | Agren .............. H04N 21/43637 |
| | | 370/315 |
| 2008/0291891 A1* | 11/2008 | Jerlhagen ............ H04L 43/0864 |
| | | 370/350 |
| 2011/0205347 A1* | 8/2011 | MacNaughton ..... H04N 13/341 |
| | | 348/56 |
| 2012/0058727 A1* | 3/2012 | Cook ....................... H04R 3/00 |
| | | 455/41.3 |
| 2015/0156740 A1 | 6/2015 | Hubball et al. |
| 2018/0220384 A1 | 8/2018 | Kerai |

OTHER PUBLICATIONS

Nonfinal Office Action dated Jan. 29, 2020 from U.S. Appl. No. 16/176,174, 38 pages.

Notice of Allowance dated Apr. 9, 2020 from U.S. Appl. No. 16/176,174, 18 pages.

"Bluetooth_Core_Specification," Revision v5.2, Dec. 31, 2019, Bluetooth SIG Proprietary, https://www.bluetooth.com/specifications/adopted-specifications, 299 pages.

* cited by examiner

SYNCHRONIZATION METHOD FOR SYNCHRONIZING CLOCKS OF A BLUETOOTH DEVICE

CROSS REFERENCE TO RELATED APPLICATIONS

This application is a continuation of U.S. patent application Ser. No. 16/176,174, filed on Oct. 31, 2018, which claims priority to EPO Pat. App. No. EP18306402.1, filed on Oct. 26, 2018, both of which are incorporated by reference herein in their entirety for all purposes.

BACKGROUND

Wireless communication is today a key component of mobile devices. Multiple devices part of a wireless network must sometimes be synchronized in order to make transmitted time-related data meaningful. This is, for example, the case when audio data is sent wirelessly to multiple devices and must be outputted at the same time.

By default, the local clocks of the devices in the wireless network are completely unrelated as they are derived from clock signals produced by different clock generators. A clock generator is a hardware oscillator, usually a crystal oscillator, although simpler tank circuits and even RC circuits may be used. The angular frequency of the hardware oscillator determines the rate at which the local clock runs.

All local clocks are subject to a clock drift, also called clock skew; oscillator frequency will vary unpredictably due to various physical effects. So, two local clocks issued from two wireless devices differ not only from a relative offset, being the difference of the offsets of each local clock compared to real time, but also from a relative drift. Equalizing just the instantaneous values (correcting the offsets) of clocks is not enough for synchronization since the local clocks will drift away afterwards.

Therefore, a synchronization scheme should either equalize the clock rates as well as offsets, or it should repeatedly correct the offsets to keep the clocks synchronized over a time period.

The above definition of synchronization actually defines the strictest form of synchronization, where one seeks perfect matching of time on different clocks, but this definition can be relaxed to different degrees according to the needs of an application.

Multiple techniques have been developed to solve this issue. The Network Time Protocol (NTP) is a networking protocol for clock synchronization that is used by all internet infrastructure. A simplified version, Simple Network Time Protocol (SNTP), has been developed for simple applications. The Precision Time Protocol (PTP) is a protocol that is used to synchronize clocks in a Wireless Local Area Network (WLAN). Many other techniques exist such as Time-sync Protocol for Sensor Networks (TPSN) or Flooding Time Synchronization Protocol (FTSP). All these techniques rely on sort of a message exchange between the devices and are advantageous as they do not rely on a particular wireless protocol.

Multiple wireless protocols have been created, such as Wi-Fi or Bluetooth, using different spread spectrum techniques to achieve larger bandwidth. Some of them, like Bluetooth, use fast Frequency Hopping Spread Spectrum (FHSS): the carrier is rapidly switched among many frequency channels using a pseudorandom sequence known to both transmitter and receivers. This inherently requires that both transmitter and receivers share a common clock. In Bluetooth, a network of multiple devices is called a piconet and this clock is the Bluetooth piconet clock. This clock is used to schedule the transmission of packets over the piconet.

In the Bluetooth standard, every Bluetooth device has a Bluetooth reference clock (noted CLKR in the standard), which is driven by the free running system clock. The free running system clock, which is the controller clock, corresponds to the free running clock of the processor on which the controller runs (for instance a quartz clock). Every Bluetooth clock also has a Bluetooth native clock (noted CLKN in the standard) which is defined from the Bluetooth reference clock CLKR by adding an offset (noted time_based_offset in the standard). The so-called "Bluetooth clock" (or "Bluetooth piconet clock", noted CLK in the standard) corresponds to the Bluetooth native clock CLKN of the master of the piconet. This Bluetooth clock is shared between all the Bluetooth devices of the piconet and used for transmitting and receiving data packets. More specifically, for each device of the piconet except the master (i.e. all the sink devices), an offset (noted slave_offset in the standard) is added to its Bluetooth native clock so that its Bluetooth clock (equal to its Bluetooth native clock plus the offset) corresponds to the master's Bluetooth native clock (i.e. the Bluetooth piconet clock). In the following, for the sake of clarity, the wording "Bluetooth piconet clock" is used to designate the Bluetooth native clock of the master, the wording "Bluetooth clock" of the master device is used to designate the Bluetooth native clock of the master device, and the wording "Bluetooth clock" of a sink device is used to designate the result of adding an offset to the Bluetooth native clock of the device.

The Bluetooth clocks of the sink devices involved in the piconet are periodically resynchronized with the Bluetooth piconet clock. The reason is that, during normal operations, the reception of a packet, defined at a certain Bluetooth tick, must take place in a window length of 20 µs, which allows the packet to arrive up to 10 µs too early or 10 µs too late.

This behavior is exemplified in relation of FIG. 10. For instance, if a packet 1001 is received at a time t1 while it was expected to be received at a time t2, the Bluetooth clock of the sink device may be resynchronized by modifying the slave offsets according to the time elapsed between t1 and t2. Indeed, the time at which the packet should be received is well defined in the standard and is aligned with the Bluetooth piconet clock. Any signal/packet that is expected to be received on a Bluetooth piconet on a specific time (as described here) may be a piconet-synchronized signal in the language of the claims.

In addition, each Bluetooth device has a respective local clock, which is dedicated to some applications, including applications relative to the audio content (for instance, the local clock of a slave is used for playing audio data).

The common clock (i.e. Bluetooth piconet clock) that is shared by the transmitter and the receivers could be used to synchronize the local clocks of the Bluetooth devices part of the piconet. However, this information is only available in the controller stack, the part of the protocol stack that contains the timing critical radio interface. The second part of the protocol stack, the host stack, that deals with high level data, does not have access to the timing information with an accuracy that is good enough for use cases such as audio synchronization.

Indeed, the host stack only has access through the Host Controller Interface (HCI) to a method HCI_Read_Clock that returns the value of the Bluetooth piconet clock in ticks in an asynchronous Command Complete event. Because one tick of the Bluetooth clock is equal to 312.5 μs and because the HCI is asynchronous and thus subject to huge delays depending on the chip activity (if there is a heavy packet traffic, the command will be delayed a lot), the values returned by simultaneous HCI_Read_Clock on the devices of the piconet can vary from several milliseconds.

The controller stack is generally implemented in a low-cost silicon device containing the Bluetooth radio and a microprocessor. The host stack is generally implemented as part of an operating system, or as an installable package on top of an operating system. For integrated devices such as Bluetooth headsets, the host stack and controller stack can be run on the same microprocessor to reduce mass production costs. In all cases, the host stack runs on the same processor as the application layer and interacts with it. So, because the values of the timing reference retrieved by the host stack can vary from several milliseconds, the synchronization of the local clocks is subject to the same variations.

Synchronizing precisely local clocks is particularly important for instance in the context of wireless audio loudspeakers communicating with an audio source device via a Bluetooth protocol. In particular, desynchronization between two earbuds (or similar) may be inconvenient for the user even if the desynchronization is not greater than 300 μs.

By "loudspeaker", it is meant any electroacoustic transducer, which converts an electrical audio signal into a corresponding sound. The term "loudspeaker" includes for instance audio speakers of a stereo system, headphones, earbuds, hearing aids, etc. The audio source device (or simply "source device", or "source") may be, for instance, a mobile phone, a portable game player, a portable media player, a computer, a tablet, a television, a control device of a stereo system, etc. In the following, the source device may also be referred to as "control device" (which is different from the "controller").

In the prior art, many solutions have been proposed to overcome a proper rendering of audio on two or more sinks devices and these solutions are described below.

In first wireless loudspeaker systems of the prior art, the loudspeakers communicated with an audio source device via a wireless communication protocol, such as Bluetooth or Wi-Fi, but were connected to each other by a wired link. Typically, these systems used a single radio frequency (RF) transceiver to deliver audio to separate loudspeakers via the wired link.

In the past few years, some solutions have been implemented to avoid such a wired connection between the loudspeakers. These solutions may concern systems in which the loudspeakers are earbuds, in the number of two (left and right).

One solution consists in a chained connection between the source, the first earbud and the second earbud, as represented in FIG. 1a. The wireless audio system of FIG. 1a comprises an audio source device 101, a first earbud 102 and a second earbud 103. For instance, the first earbud 102 may correspond to the left earbud and the second earbud 103 may correspond to the right earbud.

The first earbud 102 is connected to the source device 101 according to a first wireless link 104. Typically, the wireless link 104 is a Bluetooth link using the Advanced Audio Distribution Profile (A2DP) constructed from several layers defined by the Bluetooth standard. A stereo stream 105 including packets incorporating stereo data for both left and right channels is transmitted from the source device 101 to the first earbud 102. The first earbud 102 is configured: (i) to play only the audio data relative to one of the two channels (for instance, the left channel); and (ii) to send the mono audio data 106 relative to the other channel to the second earbud 103, via a second wireless link 107.

Typically, the second wireless link 107 may be a Bluetooth link (for instance, True Wireless Stereo), or a Near Field Magnetic Induction (NFMI) link. The second wireless link 107 may also be used for exchanging some synchronization parameters between the two earbuds 102 and 103.

Another solution consists in a wireless link from the source device to one of the two earbuds, while the other earbud is configured to "sniff" (or "snoop") the wireless link, as represented in FIG. 1b. The wireless audio system of FIG. 1b comprises an audio source device 101, a first earbud 108 and a second earbud 109. As it has been recited above, the first earbud 108 may correspond to the left earbud and the second earbud 109 may correspond to the right earbud.

The first earbud 108 is connected to the source device 101 according to a first wireless link 110. Typically, the wireless link 110 is a Bluetooth link using the Advanced Audio Distribution Profile (A2DP). A stereo stream 111 including one or more packets incorporating stereo data for both left and right channels is transmitted from the source device 101 to the first earbud 108.

On the other hand, the first earbud 108 is connected to the second earbud 109 according to a second wireless link 112 (a Bluetooth link for instance). The first earbud 108 and the second earbud 109 can exchange some parameters, including sniffing/decoding parameters 113 for allowing the second earphone to sniff the first link 110 and to retrieve the audio data relative to the right channel. However, no audio data is exchanged via the second link 112. According to this solution, the second earbud 109 is not connected to the source device 101, and is configured to sniff the first wireless link 110.

However, these solutions have drawbacks.

For instance, according to these solutions, a wireless link between the two earbuds is required (i.e. an additional transmitter chip can be required and it may increase the cost of these earbuds). In addition, such link may suffer from transmission instabilities, partly because the head is effective in blocking radio waves propagation. Furthermore, the wireless link between the two earbuds leads to an increase in battery consumption, especially when it is used to retransmit audio data. In addition, it is necessary to wait for the second earbud to receive the audio data and/or the sniffing parameters from the first earbud, which may cause latency of the system.

Furthermore, these solutions require that the two earbuds be paired together, which limits the possibilities of controlling the two earbuds independently from each other.

There also are solutions of the prior art for controlling a plurality of Bluetooth devices (also called "sink devices") from a source device by creating a point-to-multipoint link between the source device and the plurality of sink devices, even though this is not initially provided by the Bluetooth standard.

In the Bluetooth standard, audio transmission is defined by the Advanced Audio Distribution Profile (A2DP). The A2DP profile is based on the Audio/Video Distribution Transport Protocol (AVDTP) building block which defines the procedures between Bluetooth devices for establishing the audio stream, negotiating the audio stream parameters and transmitting the audio stream data. According to the AVDTP, an audio stream must be established between two Stream End Points (SEPs).

A SEP represents the resources and capacities of a device. For example, a device such as a portable telephone may have three SEPs, one representing its video receiver capacities, another representing its audio receiver capacities with an SBC codec and a last representing its audio receiver capacities with an aptX codec. Each codec must be associated with a SEP that is different from that or those to which one or more codec(s) is or are associated, but a same codec can be associated with several SEPs.

A limitation imposed by the AVDTP according to the Bluetooth standard is that when a stream has been negotiated between two SEPs, these two SEPs must be locked to each other to deliver it. A used SEP cannot be part of another stream. Switching to a new stream is typically done by terminating the previous one (such as current social modes).

A solution for controlling a plurality of Bluetooth devices (also called "sink devices") from a source device is to create several Source Stream End Points (SEPs) in the source device controlling chip. A distinct Source SEP may be generated for each Sink SEP to establish one audio stream between the source device and each sink device. For example, and for this implementation, it is referred to application EP17182123.4, which proposes a Bluetooth chip configured to implement a modified A2DP profile so as to create such point-to-multipoint link. According to this solution, a single Bluetooth chip can be used to control several Bluetooth multimedia devices. The A2DP profile is modified without violating the Bluetooth standard, so that interoperability is preserved and the Bluetooth functions are normally supported.

According to such solution, it is possible to transmit respective audio packets from the master device to each of the sink devices, the master device and the sink devices therefore belonging to a same piconet.

Audio packets may be timestamped on the master side using the local clock of the master device and sent to respective sink devices. On the sink device side, the timestamps may then be used to play the received audio data at the right time.

If no reliable synchronization is performed, it is possible that each sink device has a different value of its local clock and thus the sink devices are not able to play a sound timestamped packet at the same time, i.e. the time of the timestamp of the received packet.

There is thus a need for an efficient synchronization method for a wireless system, in particular a wireless audio system in which the loudspeakers can receive and play audio data without suffering desynchronization that might be inconvenient for the user.

The invention aims to provide a reliable synchronization method between a host clock and a controller piconet synchronized signal in order to achieve a global synchronization of the local clocks of the Bluetooth devices of the piconet.

SUMMARY

A method for synchronizing a host system of a Bluetooth device of a Bluetooth piconet with a timing reference of a master device of the Bluetooth piconet is disclosed. The host system supporting a host stack of a Bluetooth protocol, and said Bluetooth device including a controller supporting a controller stack of the Bluetooth protocol. The method comprises: receiving, at the controller, a piconet-synchronized signal; providing, by the controller to the host system, a derivative of the piconet-synchronized signal; determining a latency of the providing; and synchronizing, at the host system of the Bluetooth device, a host clock with the master timing reference of the Bluetooth piconet using said latency and the derivative of the piconet-synchronized signal.

The following definitions are applicable.

Master timing reference of the Bluetooth piconet: The system-level reference that the invention wants to have synchronized with the host clock. It can be the Bluetooth piconet Clock. It can be a counter broadcast through the Bluetooth piconet which is incremented with a timing value. It can be any timing reference used to synchronize data packets among devices in the Bluetooth piconet.

Piconet-synchronized signal: A signal received by the controller that includes the master timing reference. If the device is a slave, it can be a packet which synchronizes the controller Bluetooth Clock based on when it is received. As such, this is the broadest term (i.e., any signal received on a Bluetooth piconet is a piconet-synchronized signal because of how the Bluetooth protocol operates). It can be a packet with the counter value of the master timing reference. The piconet-synchronized signal "carries" the master timing reference either explicitly in data or based on when it is transmitted and/or received.

Derivative of the piconet-synchronized signal: Any derivative signal generated by the Bluetooth device after receipt of the piconet-synchronized signal. It could be the master timing extracted from the piconet-synchronized signal, a value function of it or a new signal generated from the piconet-synchronized signal.

Host clock: Any clock that is derived from the physical clock of the processor on which the host system of the Bluetooth device runs.

"Providing" by the controller to the host: A broad term that encompasses all of the ways information can be delivered from the controller to the host, whether it involves a physical medium or not (e.g. an application programming interface, API). This includes in particular: (i) transferring the derivative of the piconet-synchronized signal with a fixed latency from the controller to the host; (ii) transmitting the derivative of the piconet-synchronized signal timestamp of a clock shared by the controller and the host; (iii) transferring a triggering signal with a fixed latency when the derivative of the piconet synchronized signal is read followed by transmitting the derivative of the piconet-synchronized signal.

The derivative of the piconet-synchronized signal may be, in one or several embodiments, a signal carrying information related to a value function of the Bluetooth clock of the Bluetooth device. By "value function of a clock", it is meant a value of the clock, or a value derived (directly or indirectly) from the value of the clock.

The Bluetooth clock of the device is defined by the Bluetooth standard and has been presented above. This Bluetooth clock is a 28-bit counter that ticks in units of 312.5 μs, which is generally incremented by a counter of the order of 0.5 μs. In one or several embodiments, the value function of the Bluetooth clock may be for instance a non-standard clock derived from this ½ μs-counter. Such non-standard clock ticks in units in order of 0.5 μs, which may be particularly advantageous in applications such as audio playing.

The synchronization of the host clock is optional. Indeed, the above method could be used for determining an accurate value of the Bluetooth clock of the device for other purposes.

Regarding the determination of the latency, there is a plurality of ways for such determination, especially function of the architecture of the transmission of message and/or of the architecture of the BT chip. For instance, the latency may be a fixed latency (e.g. for instance if the transmission is synchronous) or the latency may be dynamically determined (e.g. for instance, if the transmission is asynchronous).

The latency may be determined based on a predetermined value associated with the Bluetooth device (e.g. a fixed/mean latency of a synchronous transmission, if said latency is always quite similar among transmissions).

By "fixed latency", it is meant that the latency may be fixed, or may have variations that are negligible compared to the synchronization accuracy (e.g. within 5% around the mean value of the latency, the mean value of the latency being named thus fixed latency).

The providing step may use a synchronous message, a time of transmission of said synchronous message corresponds to said predetermined value.

The method may further comprise, before the providing step: (i) reading the derivative of the piconet-synchronized signal; (ii) upon said reading, sending, by the controller to the host system a second synchronous message; and (iii) upon receiving said second synchronous message, reading by the host system the value of the host clock (i.e. at a time T1). The latency is determined based on the second synchronous message.

The latency may be further determined based on a time (T1) of transmission of said second synchronous message.

As detailed below, it is not possible to know, a priori, when the derivative of the piconet-synchronized signal has been read. The derivative of the piconet-synchronized signal can therefore not be used as such. To overcome this issue, the present invention proposes to determine a value of a host clock corresponding to the time at which the derivative of the piconet-synchronized signal has been read.

It is thus possible to estimate the derivative of the piconet-synchronized signal at a given time, for instance at the time at which the asynchronous request was sent. It is then possible to use this value to synchronize the host clock of the device.

In one or several embodiments, the method may further comprise determining, at the controller of the Bluetooth device, a value function of a device Bluetooth clock based on when the piconet-synchronized signal is received. The value function of the device Bluetooth clock may be the derivative of the piconet-synchronized signal. The providing step may comprise providing the value function of the device Bluetooth clock to the host system.

For example, the providing step may comprise: (i) reading, by the controller, a value of the value function of the device Bluetooth clock; and (ii) sending from the controller, to the host system, the value of the value function of the device Bluetooth clock.

The local clock, the Bluetooth native clock, the Bluetooth clock and the free running system clock are different clocks defined in the Bluetooth standard, and described for instance in the Bluetooth Core Specification version 5.0.

In an embodiment, the method may further comprise sending an asynchronous request, from the host system to the controller, for reading the piconet-synchronized signal of the Bluetooth device, and the reading of the piconet-synchronized signal may be performed in response to said request.

Alternatively, the controller may read and send the piconet-synchronized signal to the host system without receiving such request. In an embodiment of the invention, the controller may for instance periodically read and send the piconet-synchronized signal to the host system. In another embodiment, the controller may read and send the piconet-synchronized signal to the host system if a criterion is met. For instance, the offset between the Bluetooth native clock and the Bluetooth clock of a device may change. It can be decided that, at each change of the offset value, the controller sends a value function of the Bluetooth clock to the host system.

In one or several embodiments, the method may further comprise: (i) receiving, at the controller of the Bluetooth device, a second piconet-synchronized signal; (ii) providing, by the controller to the host system, the second piconet-synchronized signal; (iii) wherein the synchronizing is based on a first counter in the piconet-synchronize signal and a second counter in the second slave-synchronized signal.

The piconet-synchronized signal and the second piconet-synchronized signal may be broadcast on an Active Slave Broadcast transport of the Bluetooth Piconet.

Therefore, by repeatedly sending a broadcast message on the Active Slave Broadcast transport of the Bluetooth Piconet with an incremented number, it is possible to create a synchronizing tool for synchronizing the host clock of a sink device with the master timing reference of the Bluetooth piconet.

Another specific embodiment of the invention relates to a Bluetooth device of a Bluetooth piconet, said Bluetooth device comprising a host system and a controller, said host system supporting a host stack of a Bluetooth protocol, and the controller supporting a controller stack of the Bluetooth protocol, wherein the device comprises: (i) an interface for receiving, at the controller, a piconet-synchronized signal; (ii) an interface for providing, by the controller to the host system, a derivative of the piconet-synchronized signal; (iii) a circuit for determining a latency of the providing; and (iv) a circuit for synchronizing, at the host system of the Bluetooth device, a host clock with a master timing reference of the Bluetooth piconet using said latency and the derivative of the piconet-synchronized signal.

Yet another specific embodiment of the invention relates to a non-transitory computer readable storage medium, having stored thereon a computer program comprising program instructions, the computer program being loadable into a data-processing unit and adapted to cause the data-processing unit to carry out the steps of any of the above methods when the computer program is run by the data-processing device.

Another specific embodiment of the invention relates to a method, performed by a Bluetooth device comprising a host system supporting a host stack of a Bluetooth protocol and a controller supporting a controller stack of the Bluetooth protocol, for wirelessly transmitting audio data to a plurality of Bluetooth audio sink devices. This method may comprise: (i) creating a point-to-multipoint link from a Bluetooth chip of the Bluetooth device to the plurality of Bluetooth audio sink devices; (ii) receiving a main audio stream part; (iii) synchronizing a host clock of the Bluetooth device with a master timing reference according to one of the above synchronizing methods; (iv) creating a plurality of packet sets based on said main audio stream part, each packet set comprising at least one packet, each packet set being directed to a respective sink device among the plurality of Bluetooth audio sink devices; (v) timestamping the at least one packet of each packet set based on the synchronized host clock; and (vi) transmitting the at least one timestamped packet of each packet set to the respective Bluetooth audio sink device via a respective wireless link of the point-to-multipoint link, said respective wireless link connecting the Bluetooth device and the respective audio sink device.

This transmission method is advantageous in that it provides a point-to-multipoint link between the Bluetooth device and the plurality of sink devices. This point-to-multipoint link may be seen as a plurality of point-to-point links, each of them linking the Bluetooth device and a given sink device among the plurality of sink devices, this plurality of point-to-point links being established "permanently" during the connection time (as opposed to the standard Bluetooth communication, in which quick switches to new connections are typically performed by terminating a previous connection while keeping the previously connected sink device in memory).

By using any of the above synchronization methods, the host clock (which may be for instance the local clock) may be accurately synchronized and used for timestamping the audio packets to be sent to each of the sink devices.

According to an embodiment of the transmission method, the main audio stream may be an audio stream with multiple channels, and the at least one transmitted timestamped packet may contain mono audio data relative to a channel among the multiple channels.

According to this embodiment, only the data relative to the mono audio content that has to be played by a given sink device may be sent. The amount of data that has to be sent is therefore reduced.

Another specific embodiment of the invention relates to a Bluetooth device for wirelessly transmitting audio data to a plurality of Bluetooth audio sink devices, the Bluetooth device comprising a host system supporting a host stack of a Bluetooth protocol and a controller supporting a controller stack of the Bluetooth protocol. This Bluetooth device may comprise: (i) a Bluetooth chip configured to create a point-to-multipoint link from said Bluetooth device to the plurality of Bluetooth audio sink devices; (ii) an interface for receiving a main audio stream part; (iii) a circuit for synchronizing a host clock of the Bluetooth device with a master timing reference according to one of the above synchronizing methods; (iv) a circuit for creating a plurality of packet sets based on said main audio stream part, each packet set comprising at least one packet, each packet set being directed to a respective sink device among the plurality of Bluetooth audio sink devices; (v) a circuit for timestamping the at least one packet of each packet set based on the synchronized local clock; and (vi) a circuit for transmitting the at least one timestamped packet of each packet set to the respective Bluetooth audio sink device via a respective wireless link of the point-to-multipoint link, said respective wireless link connecting the Bluetooth device and the respective audio sink device.

Yet another specific embodiment of the invention relates to a non-transitory computer readable storage medium, having stored thereon a computer program comprising program instructions, the computer program being loadable into a data-processing unit and adapted to cause the data-processing unit to carry out the steps of any of the above transmission methods when the computer program is run by the data-processing device.

Another specific embodiment of the invention relates to a method for rendering audio signals, the method being performed by a Bluetooth audio sink device configured to be wirelessly connected to a Bluetooth master device, the Bluetooth audio sink device comprising a host system supporting a host stack of a Bluetooth protocol and a controller supporting a controller stack of the Bluetooth protocol, wherein the method may comprise: (i) synchronizing a host clock of the sink device with a master timing reference according to one of the above synchronizing methods; (ii) receiving at least one timestamped packet on a dedicated link established between the sink device and the Bluetooth master device; and (iii) rendering an audio signal based on the at least one timestamped packet and on the synchronized host clock of the sink device.

According to an embodiment, said at least one timestamped packet may contain mono audio data relative to a single audio channel.

Another specific embodiment of the invention relates to a Bluetooth audio sink device comprising a host system supporting a host stack of a Bluetooth protocol and a controller supporting a controller stack of the Bluetooth protocol, wherein the Bluetooth audio sink device may comprise: (i) a circuit for being wirelessly connected to a Bluetooth master device; (ii) a circuit for synchronizing a host clock of the sink device according to one of the above synchronizing methods; (iii) an interface for receiving at least one timestamped packet on a dedicated link established between the sink device and the Bluetooth master device; and (iv) an output for rendering an audio signal based on the at least one timestamped packet and on the synchronized host clock of the sink device.

Yet another specific embodiment of the invention relates to a non-transitory computer readable storage medium, having stored thereon a computer program comprising program instructions, the computer program being loadable into a data-processing unit and adapted to cause the data-processing unit to carry out the steps of any of the above receiving methods when the computer program is run by the data-processing device.

Another specific embodiment of the invention relates to a wireless audio system for wirelessly transmitting audio data from a Bluetooth master device to a plurality of Bluetooth audio sink devices, wherein the Bluetooth master device may comprise a host system supporting a host stack of a Bluetooth protocol and a controller supporting a controller stack of the Bluetooth protocol.

The Bluetooth master device may further comprise: (i) a Bluetooth chip configured to create a point-to-multipoint link from said Bluetooth master device to the plurality of Bluetooth audio sink devices; (ii) an interface for receiving a main audio stream part; (iii) a circuit for creating a plurality of packet sets based on said main audio stream part, each packet set comprising at least one packet, each packet set being directed to a respective sink device among the plurality of Bluetooth audio sink devices; (iv) a circuit for timestamping the at least one packet of each packet set based on the synchronized host clock; and (v) a circuit for transmitting the at least one timestamped packet of each packet set to the respective Bluetooth audio sink device via a respective wireless link of the point-to-multipoint link, said respective wireless link connecting the Bluetooth master device and the respective audio sink device. Each Bluetooth audio sink device among the plurality of Bluetooth audio sink devices comprises a respective host system supporting a host stack of a Bluetooth protocol and a respective controller supporting a controller stack of the Bluetooth protocol. Each Bluetooth audio sink device among the plurality of Bluetooth audio sink devices further comprises: (i) a circuit for being wirelessly connected to the Bluetooth master device; (ii) a circuit for synchronizing a host clock of the sink device according to any of the above synchronizing methods; (iii) an interface for receiving at least one timestamped packet on a dedicated link established between the sink device and the Bluetooth master device; and (iv) an output for rendering an audio signal based on the at least one timestamped packet and on the synchronized host clock of the sink device.

Other features and advantages of the method and apparatus disclosed herein will become apparent from the following description of non-limiting embodiments, with reference to the appended drawings.

DETAILED DESCRIPTION

An approach disclosed herein proposes to synchronize the host clocks of the devices of the piconet (including the master device and the sink devices) with a master timing reference of the Bluetooth piconet. As an example and in a non-limiting way, the host clock may be the local clock as defined in the Bluetooth standard, and the master timing reference of the Bluetooth piconet may be the Bluetooth piconet clock. In this case, since the Bluetooth clocks of the sink devices are, according to the Bluetooth standard, mutually synchronized with the Bluetooth piconet clock, a way to achieve such synchronization is that each Bluetooth device (i.e. sinks) synchronizes its local clock with its Bluetooth clock.

Figure 1A:
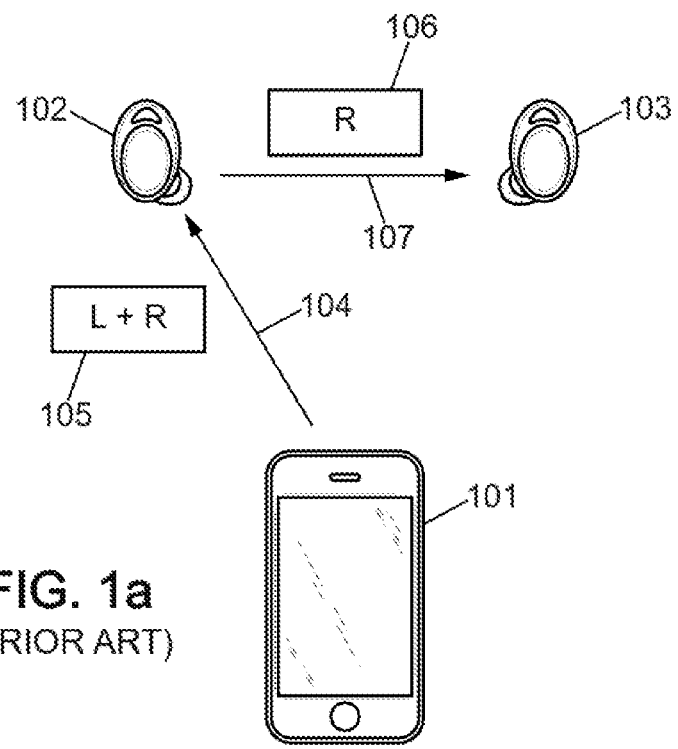
FIGS. 1a and 1b represent two examples of a wireless audio system of the related art.
Figure 1B:
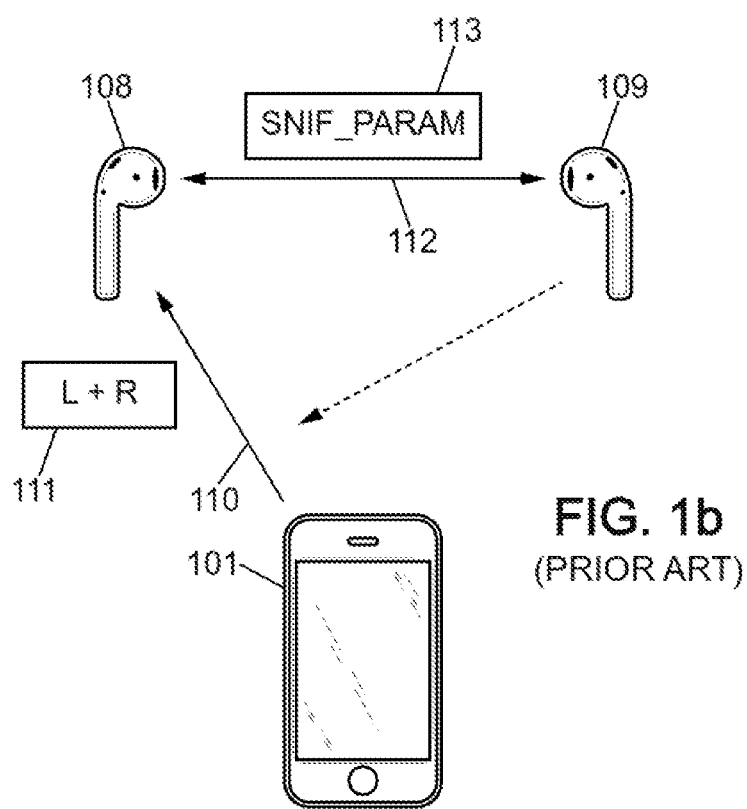
Figure 2:
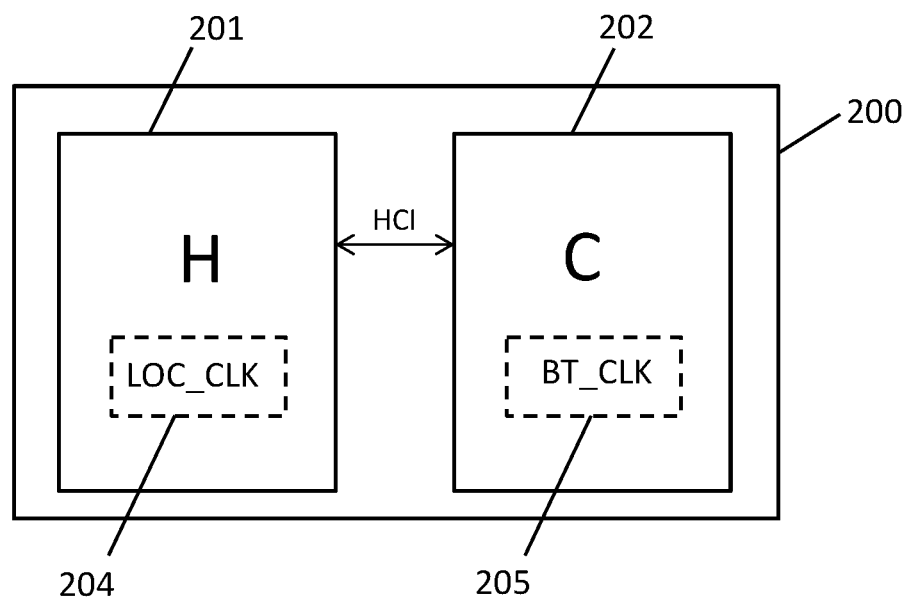
FIG. 2 represents a Bluetooth device of the prior art.

However, synchronizing a host clock of a device with a timing reference included in a signal received by the controller of the device is not an easy task. The reason for that is detailed below, with reference to FIG. 2. For the sake of simplification, FIG. 2 represents the specific example wherein the host clock is the local clock, and the master timing reference of the Bluetooth piconet is the Bluetooth clock of the device. The person skilled in the art would easily understand that the description of FIG. 2 provided below is not limited to this case.

Schematically, each Bluetooth device 200 is divided into two parts: the host system 201 and the controller 202. The host system 201 supports the host stack of the Bluetooth stack, which includes the protocol higher layers provided to manipulate and control the controller 202. Said protocol higher layers comprise for instance the Logical Link Control and Adaptation Protocol (L2CAP) and the Audio/Video Distribution Transport Protocol (AVDTP). The controller 202 supports the controller stack of the Bluetooth stack, which includes the protocol lower layers provided to manipulate and control the radio unit. Said protocol lower layers comprise for instance the Link Management Protocol (LMP). Communications between the host system 201 and the controller 202 are performed via a Host Controller Interface (HCI).

The host stack and controller stack can be run on the same microprocessor, or on two separate microprocessors. Usually, for the master device, the host stack and controller stack are run on two separate microprocessors. For sink devices such as earphones, the host stack and controller stack can be run on the same microprocessor to reduce mass production costs, the size of the device, and the power consumption. Of course, it is also possible to use two separate microprocessors for the sink devices.

As mentioned above, the Bluetooth clock 205 of a device 200 is obtained from the Bluetooth native clock, which is derived from the Bluetooth reference clock, which is driven by the free running system clock, i.e. the controller clock. Therefore, the Bluetooth clock 205 of the device 200 is located on the controller 202 side.

On the other hand, the "local clock" 204 of a Bluetooth device 200 is derived from the host clock (e.g. by adding a timing offset), which corresponds to the free running clock of the processor on which the host system 201 runs (for instance a quartz clock). Therefore, the local clock 204 of the device 200 is located on the host system 201 side.

In case the host system 201 and the controller 202 run on a same processor, the host clock and the controller clock are the same.

For synchronizing the local clock 204 of a device with its Bluetooth clock 205, the host system 201 may send a "Read Clock Command" (e.g. the HCI_Read_Clock command defined in the Bluetooth specification) for reading an estimate of the Bluetooth clock from the controller. This command is sent through the HCI. However, the message transmission on HCI is an asynchronous, so that it is not possible to know exactly when the request is read on the controller side. Therefore, the information on the Bluetooth clock received in response to the Read Clock Command cannot reliably be used for synchronizing the local clock 204 of the device with its Bluetooth clock 205.

Therefore, synchronizing the local clock of a device with its Bluetooth clock by simply using the result of the command HCI_Read_Clock provided by the specification is not accurate enough, because communications via the HCI are not synchronous. The present invention overcomes this problem and allows a reliable synchronization of the local clock of a Bluetooth device with its Bluetooth clock.

Figure 4A:
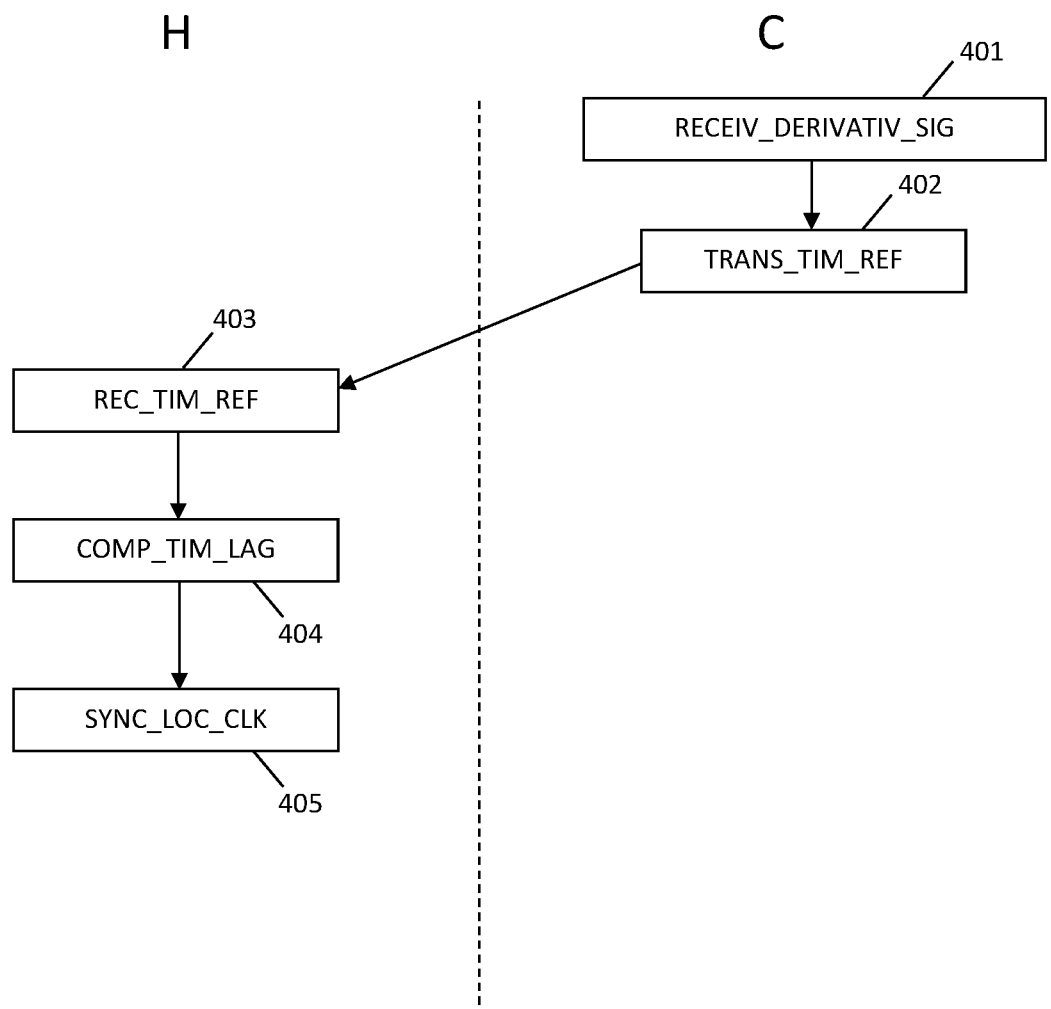
FIG. 4a is a flow chart of a general method for synchronizing clocks of a Bluetooth device, in a possible embodiment.

FIG. 4a is a flow chart of a general method for synchronizing clocks of a Bluetooth device, in a possible embodiment.

To ensure the synchronization of the local clocks of the slaves, the piconet network (a shared physical channel) is used to have a signal that is synchronized on all of them. This piconet-synchronized signal is received (step 401) by the controller of each slave device and contains a timing information.

The controller may then provide a derivative of the piconet-synchronized signal to the host (steps 402 and 403), from which the timing information can be retrieved.

It is noted that this sending may be triggered at regular intervals (e.g. the controller decides by itself the sending without any interaction with the host) or based on a message (not represented) that is received from the host as a synchronous message or as an asynchronous message, based on a random trigger, a timed trigger (every x seconds) or a criterion trigger (e.g. if the number of operations performed by the host processor is greater than a predetermined threshold). This is applicable for any embodiments described in the present application, for instance the embodiments described in relation to FIG. 4a, 4b, 4c, 4d, or 4e.

Because of the possible asynchronous behavior of the interface between the host and the controller and/or the latency of the transmission of this timing information, the host may compute the overall lag (i.e. latency) of the transmission (step 404).

Then, based on the timing information and on the computed lag (i.e. latency), the host (or any module running on the same processor) is able to synchronize the local clock with the synchronized signal (step 405). Examples of computation of said lag are described below.

Thus, each slave is able to synchronize its local clock with a signal that is synchronized on all slaves, and so all the slave local clocks are mutually synchronized.

There are multiple ways to compute the time lag (i.e. latency) of the transmission of the timing information.

The timing information can be transmitted to the host with a fixed latency (e.g. with variations that are negligible compared to the synchronization accuracy, e.g. within 5% around the mean value of the latency, the mean value of the latency being named thus fixed latency) (arrow between 402 and 403). In this case the lag (i.e. latency) is equal to the latency.

Figure 4B:
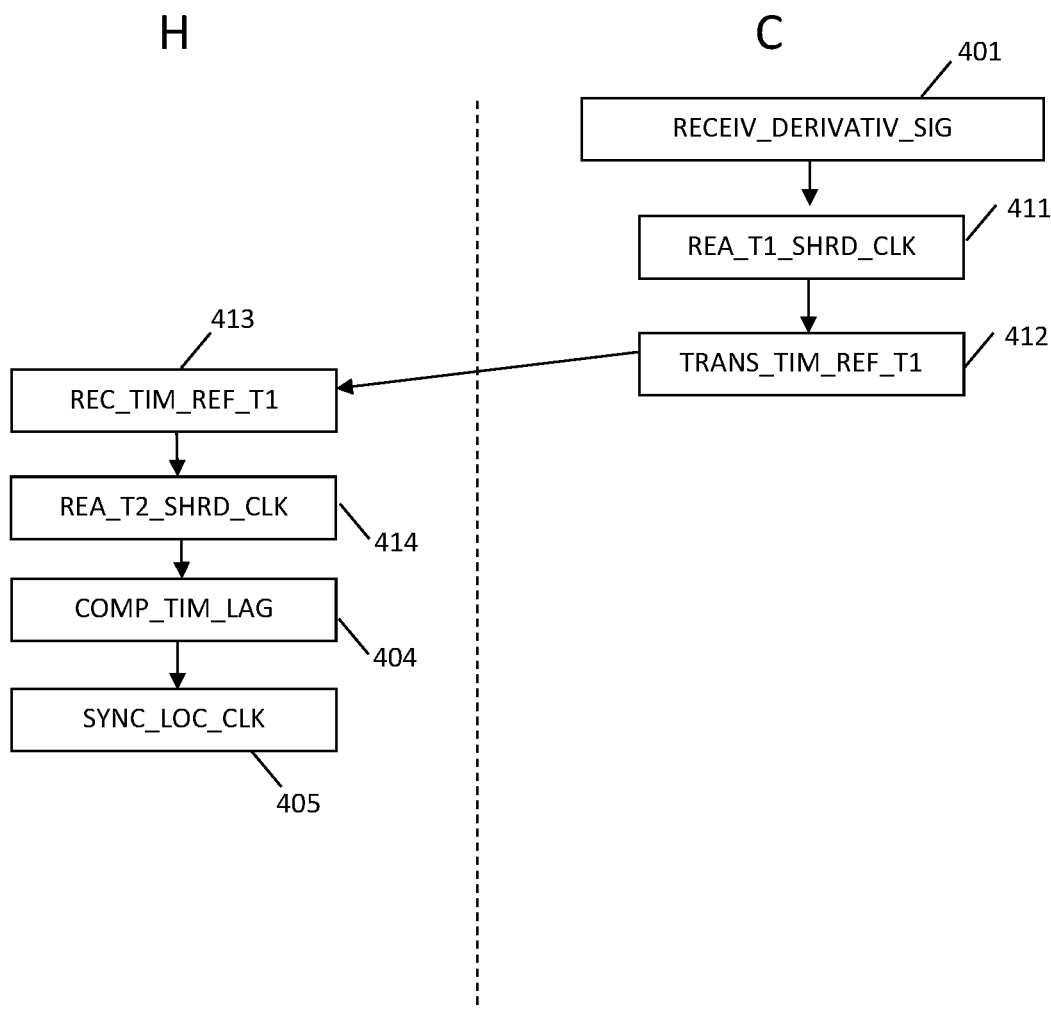
FIG. 4b is a flow chart of a method for synchronizing clocks of a Bluetooth device, in another embodiment.

In relation to FIG. 4b, the reading of the timing information can be associated with the reading of a clock that is shared by the controller and the host. This embodiment may be used when the controller has access to the local clock, for instance in the case where the host stack and the controller stack are run on the same microprocessor. It is advantageous when the controller and the host are running on the same processor (they share a same reference clock). When the controller retrieves the timing reference (step 401), it also reads a first value T1 of the shared clock (411). It then sends both timing reference and the first value of the shared clock to the host in an asynchronous way (step 412, the sending may also be synchronous). It is advantageous in the implementation where the current Host Controller Interface (HCI) has an asynchronous behavior. When the host receives the timing reference and the first value of the shared clock (step 413), it reads a second value T2 of the shared clock (step 414). Then based on the two values of the shared clock, the host computes the time lag (i.e. latency) of the transmission (step 404) (e.g. T2-T1 being the time lag, i.e. the transmission latency).

Figure 4C:
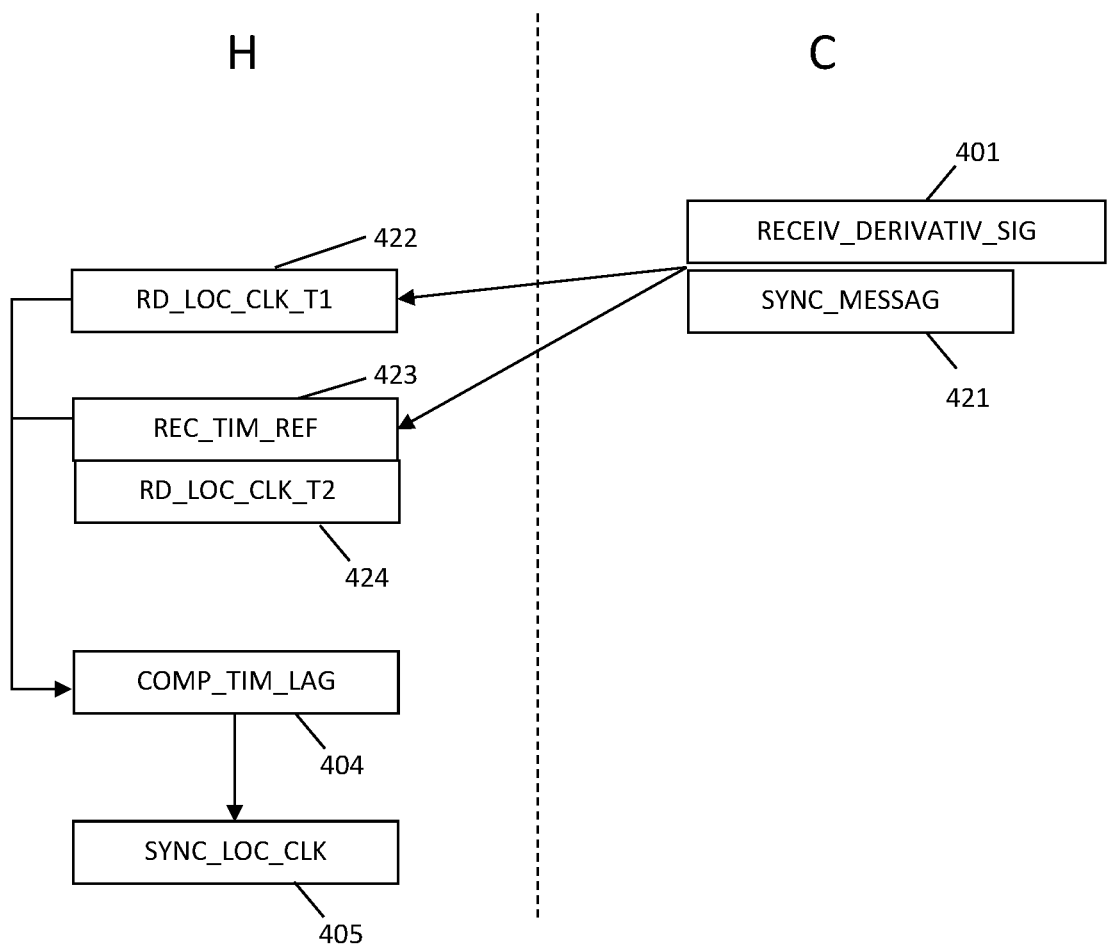
FIG. 4c is a flow chart of a method for synchronizing clocks of a Bluetooth device, in another embodiment.

In reference to FIG. 4c, the reading of the timing information can be associated with a triggering signal. When the controller retrieves the timing reference (step 401), it sends a triggering signal with a fixed latency LAT to the host (step 421). When the host receives the triggering signal, it reads a first value T1 of a local clock (step 422). Then, the controller sends the timing information in an asynchronous message (arrow between element 401 and 423). When the host receives the timing reference (step 423), it reads a second value T2 of the local clock (step 424). Then based on the two values of the local clock and the latency of the triggering signal, the host computes the time lag (i.e. latency) of the transmission (step 404, i.e. T2−T1+LAT).

Figure 4F:
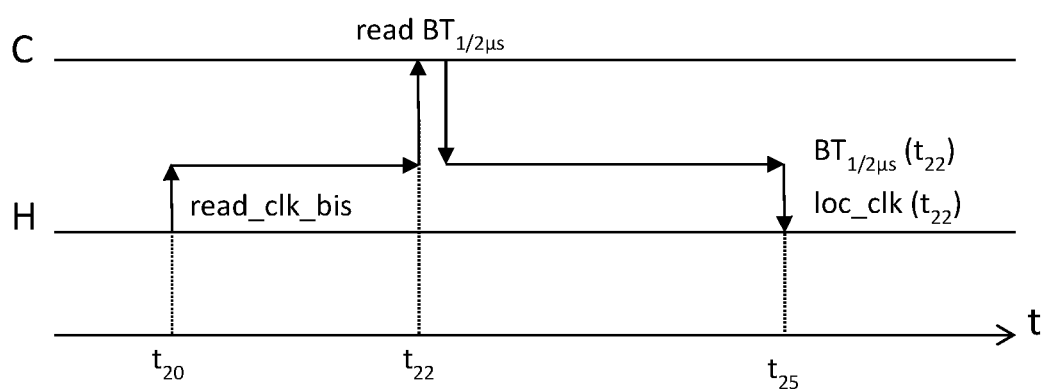
FIG. 4f represents a synchronization method according to an embodiment of the invention.

A synchronization method according to an embodiment of the invention is represented in FIG. 4f (where LAT, the latency, is assumed to be 0 or negligible, for the sake of the understanding). At a first instant $t_{20}$, the host system may send a command, noted "read_clk_bis" in FIG. 4f, to the controller for reading a current value of the Bluetooth clock of the device. The Bluetooth clock is a 28-bit counter that ticks in units of 312.5 μs (i.e. half a time slot), which corresponds to a clock rate of 3.2 kHz. Using the Bluetooth clock for synchronizing the local clock may cause a delay between the earphones that is not acceptable.

In practice, the Bluetooth clock is generally incremented by a counter of the order of 0.5 μs. Therefore, it is possible to derive a non-standard clock from this ½ μs-counter that can be used for the synchronization. This non-standard clock is hereinafter referred to as "½ μs-Bluetooth clock" for the sake of simplification, even if this denomination does not have a consecrated technical meaning. This ½ μs-Bluetooth clock may be particularly advantageous in applications such as audio playing, because it has a tick period significantly lower than the one of the Bluetooth clock.

The "read_clk_bis" command may therefore be a command for reading the (standard) Bluetooth clock or the (non-standard) ½ μs-Bluetooth clock, according to the chosen embodiment.

In the embodiment wherein the clock to be read is the Bluetooth clock, the "read_clk_bis" command may be the "read_clk" command provided by the Bluetooth standard. In the embodiment wherein the clock to be read is the ½ μs-Bluetooth clock, the "read_clk_bis" command may be a vendor-specific command added to the Bluetooth stack. The following details the case where the local clock is synchronized with the ½ μs-Bluetooth clock of the device. Of course, the method described can be easily adapted for synchronizing the local clock with the (standard) Bluetooth clock of the device.

Referring again to FIG. 4f, at a second instant noted $t_{22}$, the value of the ½ μs-Bluetooth clock $BT_{1/2\mu s}(t_{22})$ may be read by the controller. Then, at a third instant $t_{25}$, the host system may receive the value of the ½ μs-Bluetooth clock that has been read by the controller at $t_{22}$.

The command "read_clk_bis" is sent from the host to the controller via the HCI. Therefore, this command is also asynchronous. This implies that, when the controller receives the value $BT_{1/2\mu s}(t_{22})$, the controller does not know when this value was read—the received value could correspond to the value of the ½ μs-Bluetooth clock read at any time between $t_{20}$ and $t_{25}$.

To overcome this problem, the invention provides associating a reading of another clock to the reading of the ½ μs-Bluetooth clock. For instance, this other clock may be the local clock. Since the local clock is located into the host system, this information allows the host system to know when the value of the ½ μs-Bluetooth clock has been read. The Bluetooth clock may then be synchronized based on these values.

For instance, at $t_{25}$, the host system may also receive the value of the local clock $loc\_clk(t_{22})$ at time $t_{22}$ at which the clock was read, as in the embodiment represented in FIG. 4f. Of course, the value loc_clk($t_{22}$) may be received at a different time than $t_{25}$ depending on the embodiment chosen.

Sending the "read_clk_bis" asynchronous request is optional. According to an embodiment of the invention, the controller may send the value of the ½ µs-Bluetooth clock without a request being sent to it first.

Several embodiments of the reading of the local clock are detailed below.

In one possible embodiment, the host stack and the controller stack may be run on a same microprocessor. In that case, the controller has access to the local clock. Therefore, the read_clk_bis command may be a command, transmitted from the host system to the controller, for reading both the ½ µs-Bluetooth clock value and the local clock value. The host system may then receive, from the controller, the value of the ½ µs-Bluetooth clock and the value of the local clock corresponding to a same reading time.

According to the example depicted in FIG. 4f, the read_clk_bis command may be sent at time $t_{20}$, the value of the ½ µs-Bluetooth clock and the value of the local clock may be read by the controller at time $t_{22}$, and the host system may receive these values at time $t_{25}$.

The value of the Bluetooth clock of the device at a given time (in the above example, this given time corresponds to $t_{20}$) may then be obtained based on the value $BT_{1/2\mu s}\_clk(t_{22})$ of the ½ µs-Bluetooth clock and the value loc_clk($t_{22}$) of the local clock.

For instance, the value BT_clk ($t_{20}$) of the Bluetooth clock at time $t_{20}$ may be computed as:

$$BT\_clk(t_{20})=BT_{1/2\mu s}\_clk(t_{22})-\Delta t$$

where $\Delta t$ is the time elapsed between $t_{20}$ and $t_{22}$, with $t_{22}$=loc_clk($t_{22}$), and BT_clk ($t_i$), $BT_{1/2\mu s}\_clk$ ($t_i$) are the values of the Bluetooth clock and the ½ µs-Bluetooth clock at times $t_i$ and $t_j$, respectively, expressed in time value (e.g. multiplied by their respective tick periods).

Furthermore, the drift between $t_{20}$ and $t_{25}$ can be neglected, so that the value of the Bluetooth clock at $t_{25}$ may be estimated by:

$$BT\_clk(t_{25})=BT\_clk(t_{20})+5$$

More generally, if the read_clk_bis command is sent at a given time $t_1$, the value (expressed in time value) of the Bluetooth clock BT_clk_$t_1$ at said given time $t_1$ may be determined by:

$$BT\_clk\_t_1=BT_{1/2\mu s}\_clk-\Delta t_{1/2}$$

where $BT_{1/2\mu s}\_clk$ is the value of the ½ µs-Bluetooth clock (expressed in time value) received in response to said command, and $\Delta t_{1,2}$ is time elapsed between $t_1$ and $t_2$, $t_2$ being the time at which the value of the ½ µs-Bluetooth clock has been read by the controller.

If $t_3$ denotes the time at which the host system received the value of the ½ µs-Bluetooth clock, the value BT_clk_$t_3$ of the Bluetooth clock at time $t_3$ may be determined by:

$$BT\_clk\_t_3=BT_{1/2\mu s}\_clk+\Delta t_{2,3}$$

where $\Delta t_{2,3}$ is the time elapsed between $t_2$ and $t_3$.

Once the value of the Bluetooth clock is estimated, the local clock of the device may be synchronized with this Bluetooth clock. In a piconet, this method allows to precisely synchronize all devices.

Indeed, the local clock of the master device can be therefore synchronized with its Bluetooth clock (optional), the local clock of each slave device can also be synchronized with their Bluetooth clock. Since the Bluetooth clocks of all the devices—master and slaves—are synchronized with each other, all the local clocks of the piconet devices are therefore synchronized. Furthermore, in case the synchronization uses the ½ µs-Bluetooth, this synchronization has a precision of the order of ½ µs+the synchronization precision of the BT protocol (of the order of 10 µs), which is advantageous for applications such as audio playing.

In the above described embodiment, the value loc_clk($t_{22}$) of the local clock is used for indicating when the value of the ½ µs-Bluetooth clock has been read. It has to be noted that any clock shared between the controller and the host system can be used for this purpose. For instance, in case the controller and the host system are run on a same processor, the value of the controller clock (also called "Free running system clock") can be sent from the controller to the host system, as well as any clock derived from the controller clock, instead of the value of the local clock.

In another possible embodiment, the host stack and the controller stack may be run on two separate microprocessors. In that case, the controller does not have access to the local clock, so that another method is needed for retrieving the time at which the value of the ½ µs-Bluetooth clock is read.

A solution consists in "listening" on a port to determine when the controller reads the value of the ½ µs-Bluetooth clock. For instance, the controller may send a message to the host system as the controller reads the value of the ½ µs-Bluetooth clock. When the host system receives the message, the host system can read the current value of the local clock. For this current value to correspond to the time at which the controller has read the value of the ½ µs-Bluetooth clock, the message must be synchronous.

Figure 5:
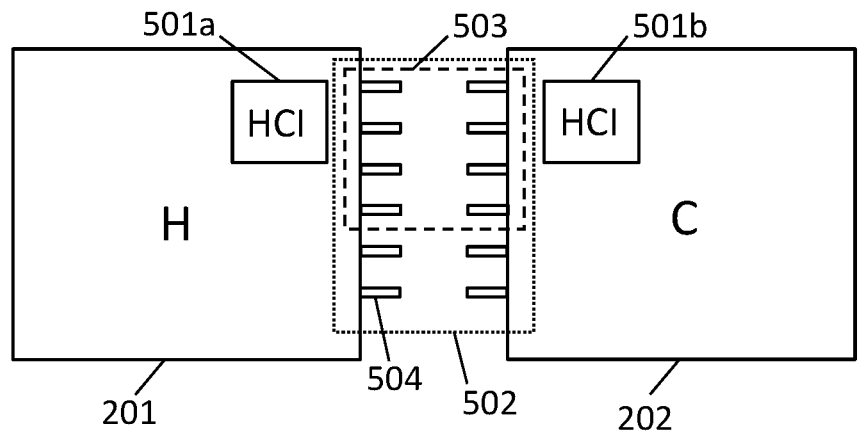
FIG. 5 represents a Bluetooth device configured for performing the synchronization method in a possible embodiment.

For instance, the synchronous message may be sent via a low-level layer (i.e. it is not sent through the HCI interface or the BT stack, it may be an external interrupt). FIG. 5 represents a Bluetooth device configured for sending such asynchronous message.

As represented in FIG. 5, communications between the host system 201 and the controller 202 may be performed via a physical interface comprising a plurality 502 of ports. The type of the physical interface may be for instance USB, UART and RS232. A set 503 of these ports may be dedicated for implementing the asynchronous Host Controller Interface (HCI) as defined in the Bluetooth standard. More specifically, the HCI driver 501a located in the host system 201 and the HCI firmware 501b located in the controller 202 may communicate via this set 503 of ports.

The remaining ports, e.g. 504, may be used for performing low-level communications between the host system 201 and the controller 202. For instance, a synchronous message may be sent on the port 502 from the controller 202 to the host system 201 for triggering a reading, by the host system, of the current local clock.

Referring again to FIG. 4f, according to this embodiment, the read_clk_bis command may be sent at time $t_{20}$ and the value of the ½ µs-Bluetooth clock may be read by the controller at time $t_{22}$. In the same time $t_{22}$, the controller may send a synchronous message to the host system. When the host system receives this synchronous message, it may read the current value of the local clock, loc_clk($t_{22}$). Again, another clock than the local clock may be used for determining when the value of the ½ µs-Bluetooth clock has been read by the controller. For instance, the host clock or any clock derived from the host clock may be used.

At $t_{25}$, the host system may receive the value of the ½ µs-Bluetooth clock $BT_{1/2\mu s}\_clk$ ($t_{22}$) that has been read at $t_{22}$.

The Bluetooth clock may then be determined based on the value of the ½ µs-Bluetooth clock and the value of the local clock similarly as in the previous embodiment. Of course, all the formulas presented above remain valid, as well as the synchronization of the local clock with the Bluetooth clock.

Even though this embodiment is particularly advantageous in the case where the host stack and the controller stack are run on two separate microprocessors, it has to be noted that it may also be used in the case where the host stack and the controller stack are run on the same microprocessor.

Figure 4D:
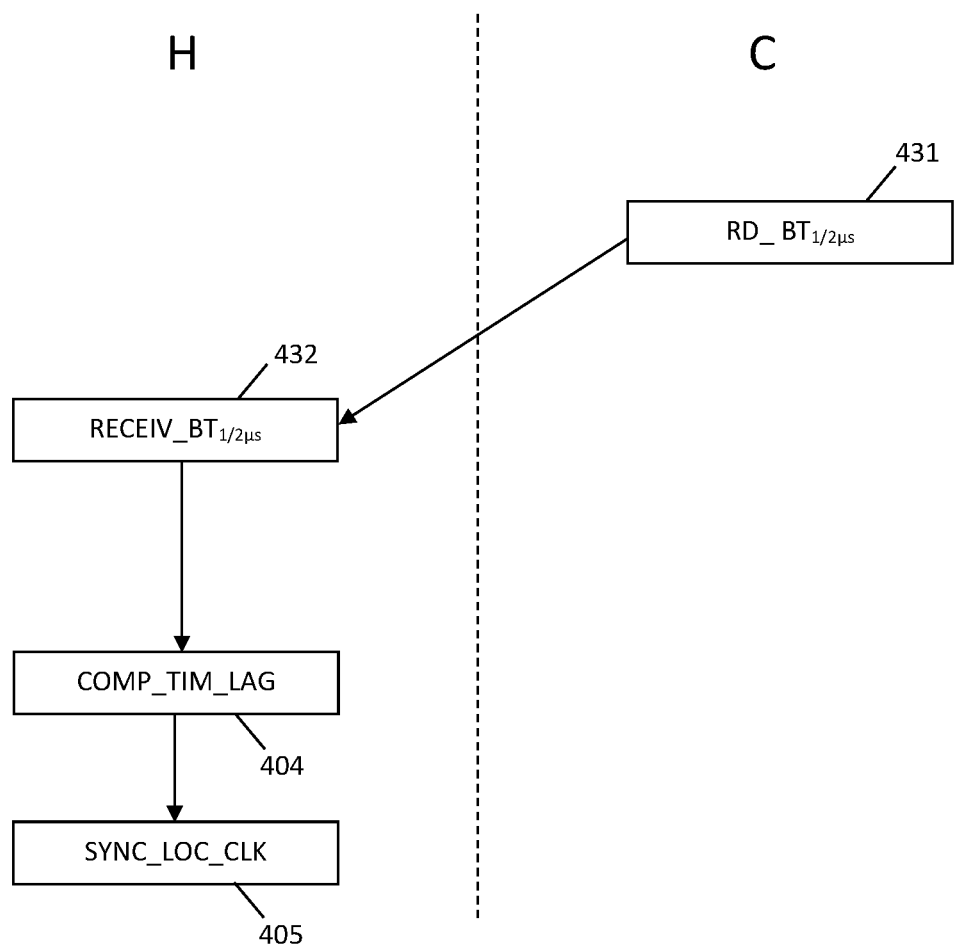
FIG. 4d is a flow chart of a method for synchronizing clocks of a Bluetooth device, in another embodiment.

FIG. 4d is a flow chart of a method for synchronizing clocks of a Bluetooth device, in another embodiment. In this embodiment, the synchronization is achieved by synchronizing all the devices' local clocks with the piconet clock.

As mentioned above, the Bluetooth devices in a piconet share a same Bluetooth clock: every Bluetooth device shall have a native clock that shall be derived from a free running reference clock. For synchronization with other Bluetooth devices in a piconet, offsets are used that, when added to the native clock, provide temporary Bluetooth clocks that are mutually synchronized. The Bluetooth clock ticks in units of 312.5 µs (i.e. half a time slot), giving a clock rate of 3.2 kHz. The Bluetooth clocks of the devices involved in the piconet are periodically resynchronized. The reason is that, during normal operation, the reception of a packet, defined at a certain Bluetooth tick, must take place in a window length of 20 µs (a packet can arrive up to 10 µs too early or 10 µs too late). This mechanism can be used to synchronize the local clocks (used to time audio) of the devices. In case the Bluetooth clock is used directly, the delay between the slaves can go up to 312.5 is (one tick), which may not be enough for some use cases. Instead, the half microseconds counters used to implement the Bluetooth clocks may be used. Therefore, in said embodiment, the master clock retrieved from the signal is the half microseconds counters $BT_{1/2µs}$.

At step 431, the controller may read a current value of the ½ µs-Bluetooth clock (for instance, this current value may correspond to the time $t_{22}$ of FIG. 4f). This value may then be received (step 432) by the host (for instance, at the time $t_{25}$ of FIG. 4f). The computation (step 404) of the lag (i.e. latency) may be one method described above.

Figure 4E:
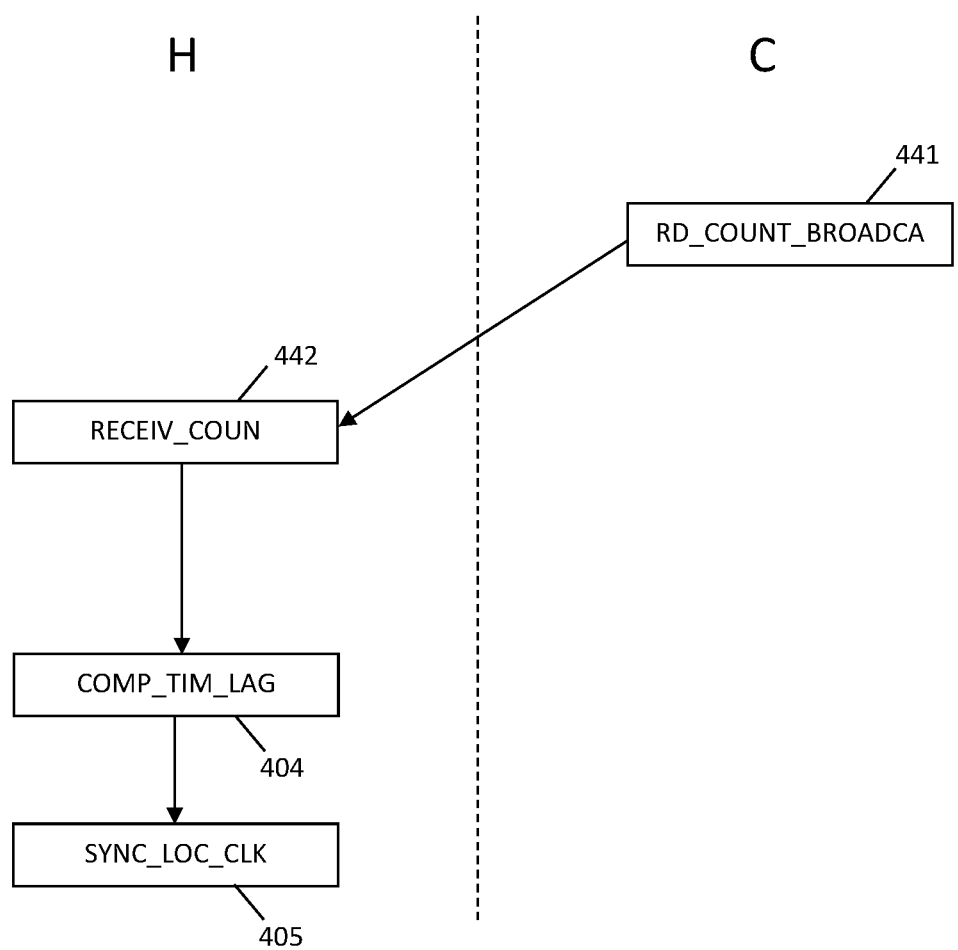
FIG. 4e is a flow chart of a method for synchronizing clocks of a Bluetooth device, in another embodiment.

In reference to FIG. 4e, another technique to achieve a proper synchronization between the slaves is to use an additional broadcast link: broadcast events are received at the same time (with the accuracy of the reception window length) and so their receptions can be used as signals synchronized on the slaves.

The broadcast data can contain a timing information that is directly the master local clock (with potentially an additional offset to take into account the transmission delay) (or a function of said master local clock) or the number of the packet that must be played in a certain timing.

In this latest case, a broadcast signal can be sent every ten seconds, containing a counter. The controller may retrieve this counter from the broadcast signal (step 441) and provide it to the host. Upon reception of the counter (step 442) the host may compute (step 404) the time lag (i.e. latency) of the transmission. The computation (step 404) of the lag (i.e. latency) may be one method described above.

The host may then synchronize (405) its clock with a value function of the counter (C) times the counter step (e.g. 10 seconds) plus the time lag (i.e. latency) of the transmission of the counter between the controller and the host (i.e. a value function of C×counter_step+lag).

The Bluetooth standard provides a way to broadcast data to all slaves in a piconet using an Active Slave Broadcast (ASB) transport. An ASB is implicitly created whenever a piconet exists. The ASB transport is used to transport L2CAP user traffic and certain LMP traffic to all devices in the piconet that are currently connected to the piconet physical channel that is used by the ASB.

There is no acknowledgment protocol and the traffic is uni-directional from the piconet master to the slaves. Thus, the ASB logical transport is unreliable. To improve reliability somewhat each packet can be transmitted a number of times. The ASB transport in the piconet can be used to trigger clocks synchronization as described above.

Figure 8:
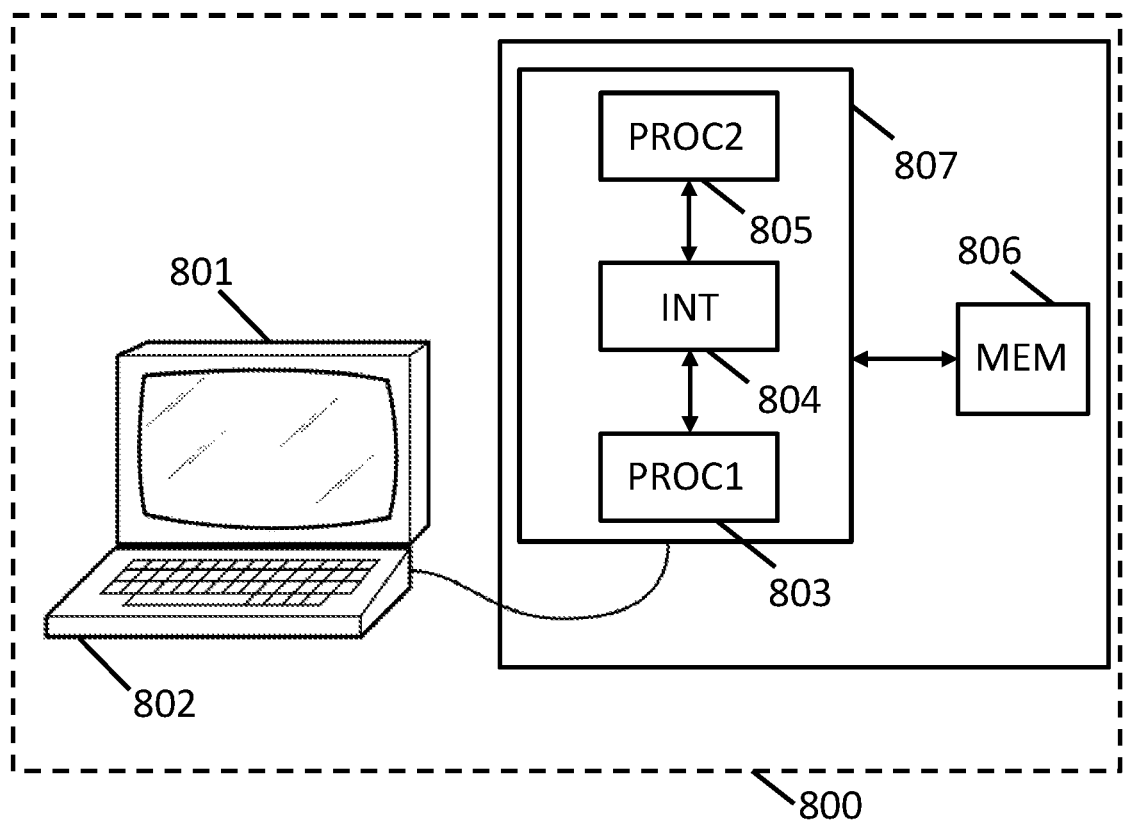
FIG. 8 represents an embodiment of a Bluetooth device configured for performing the synchronization method.

FIG. 8 represents an embodiment of a Bluetooth device configured for performing the synchronization method. In this embodiment, the device 800 comprises a computer (or any computing/electronic device), this computer comprising a memory 806 to store program instructions loadable into a circuit 807 and adapted to cause circuit 807 to carry out the steps of the present invention when the program instructions are run by the circuit 807. The memory 806 may also store data and useful information for carrying the steps of the present invention as described above. The circuit 807 may comprise a first circuit 803 located in the host system, a second circuit 805 located in the controller, and an interface 804 for exchanging data between the host system and the controller.

Each of the circuits 803 and 805 may be for instance:
- a processor or a processing unit adapted to interpret instructions in a computer language, the processor or the processing unit may comprise, may be associated with or be attached to a memory comprising the instructions, or
- the association of a processor/processing unit and a memory, the processor or the processing unit adapted to interpret instructions in a computer language, the memory comprising said instructions, or
- an electronic card wherein the steps of the invention are described within silicon, or
- a programmable electronic chip such as a FPGA chip (for «Field-Programmable Gate Array»).

To ease the interaction with the computer, a screen 801 and a keyboard 802 may be provided and connected to the computer circuit 807 (even if it is not mandatory).

The synchronization methods presented above may be used for synchronizing clocks of Bluetooth devices of a wireless audio system, as described below.

Figure 3:
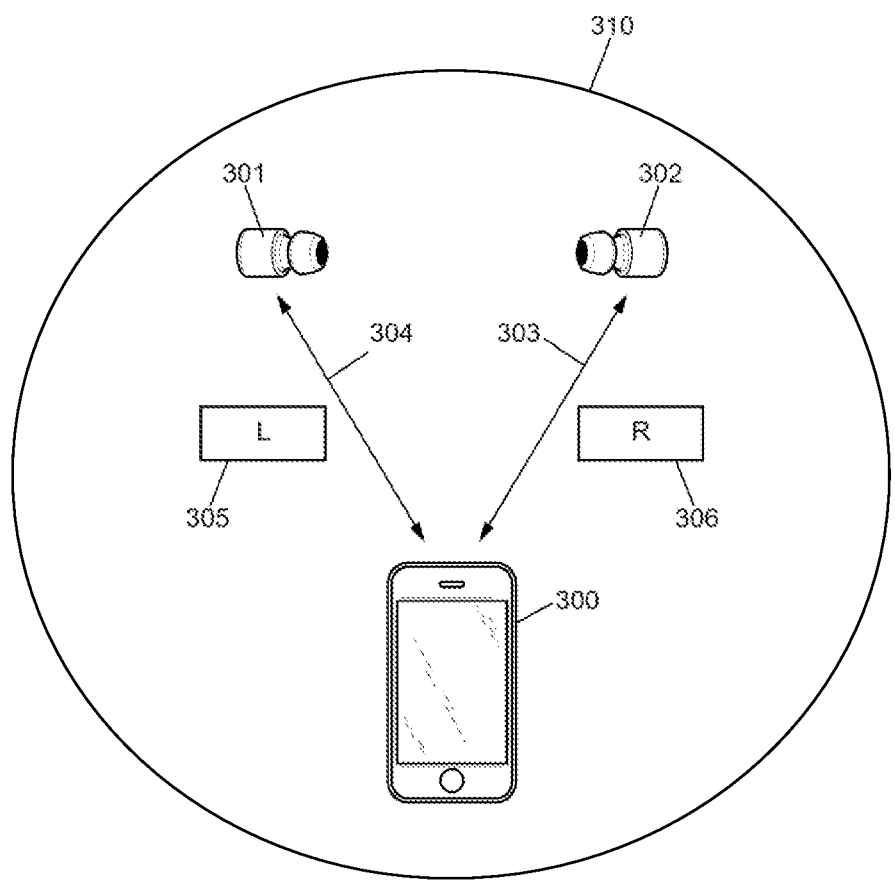
FIG. 3 is a representation of a wireless audio system according to a possible embodiment of the present invention.

FIG. 3 represents a wireless audio system according to a possible embodiment of the present invention.

This wireless audio system comprises an audio source device 300, a first earbud 301 and a second earbud 302. For instance, the first earbud 301 may correspond to the left earbud and the second earbud 302 may correspond to the right earbud.

According to an embodiment, the source device 300 comprises a Bluetooth chip (not represented in FIG. 3) arranged to generate several SEPs to control the sink devices 301, 302. For instance, the Bluetooth chip may generate a distinct Source SEP for each Sink SEP (corresponding to each Bluetooth sink device that it must control). This configuration seemingly consists in point-to-point links, from the source 300 to the sink devices 301, 302.

The source device 300 establishes a Bluetooth wireless link 303, 304 with each earbud 301, 302, so that the three devices 300, 301 and 302 form a Bluetooth piconet 310. All the controllers of the devices 300, 301 and 302 of the piconet 310 share a physical radio channel and are synchronized to a common clock (the so-called Bluetooth piconet clock) and frequency hopping pattern (this is not the case for the hosts of the devices, which are not synchronized by default). In this configuration, the source device 300 corresponds to the master device (or simply "master"), and the earbuds 301, 302 correspond to the slave devices (or simply "slaves"). The controller of the master 300 provides the synchronization reference, while the controllers of the slaves 301, 302 are synchronized to the master's Bluetooth native clock and frequency hopping pattern. Of course, even if FIG. 3 depicts two earbuds, the present invention is not limited to this case. For instance, the sink devices may be any loudspeakers as defined above, and not necessarily earphones or earbuds. Furthermore, there can be more than two sink devices.

Typically, each of the first link 303 and the second link 304 is a bidirectional Bluetooth link using standard A2DP Profile. Indeed, the first link 303 and/or the second link may also carry other profiles such as the Audio Video Remote Control Profile (AVRCP) for volume control, play/pause/next features or the Hands-Free Profile (HFP) for voice data exchanges.

In one embodiment, a mono stream 305 including one or more packets incorporating mono data for the left channel may be transmitted from the source device 300 to the first earbud 301 via link 304, and a mono stream 306 including one or more packets incorporating mono data for the right channel may be transmitted from the source device 300 to the second earbud 302 via link 303. According to this embodiment, each stream has advantageously a mono configuration, instead of a stereo configuration as in the prior art, thereby saving bandwidth usage, batteries and limiting magnetic exposition.

Furthermore, the codec used for each stream 305, 306 may be advantageously identical, to avoid having different audio quality on the earbuds. For instance, the standard mandatory SBC codec may be used for each of the streams 305 and 306. Of course, other codecs may be used, such as LDAC, apt-X or AAC.

Alternatively, the codec used for each stream 305, 306 may be different. For instance, if the first earbud has a lower battery level than the second earbud, it may be decided to use a lower audio quality on the first earbud (e.g. to limit the processed data or to limit the number of operations) or to use a different codec which requires less operations to decode the audio data.

The solution depicted in FIG. 3 offers many advantages over the prior art, including for instance:
  Higher stability: since two mono streams 305 and 306 are sent, instead of one stereo stream in the solutions of the prior art, the bandwidth usage is almost the same and, because there is no need for data retransmission through the head, the stability can be improved.
  Battery improvements: since there is no retransmission between the first earbud and the second earbud, the battery life is increased (there may be up to 50%-90% improvement in battery life over the chained solution of the prior art). The battery size can also be reduced, leading to a lower cost and a smaller overall size of the device;
  Lower latency: because there is no retransmission between the first earbud and the second earbud and no need to wait that the second earbud receives the audio data or the sniffing parameters, it also reduces the system latency;
  Ability to control both earbuds independently: since two separate communication links are created between the source device 300 and each of the earbuds 301 and 302,
the earbuds 301 and 302 may be controlled independently of each other. This offers opportunities for new applications, such as real-time translation: if each of the two earbuds includes a microphone, two independent communication links in two different languages may be created according to a translation technology (by using, for instance, a modified HFP profile for enabling a multi-device utilization). This could allow two people to share the pair of earbuds and have a multilingual conversation.

The audio packets of the streams 305 and 306 may be timestamped to be played by the sink devices 301, 302 at the right time. For instance, according to the Bluetooth standard, the audio packets are timestamped using the local clock of the source device 300. Each of the sink devices 301 and 302 may therefore receive, via its dedicated link 303 and 304 with the source device 300, audio packets including a respective timestamp defined from the local clock of the source device 300.

Advantageously, the clock frequency necessary to create the timestamp may be set to the sample rate of the encoded audio data. For instance, with the SBC codec, if a media payload consists of multiple SBC frames, the timestamp of the media packet header represents the timestamp of the first SBC frame. The timestamp of the following SBC frames may be calculated using the sample rate, the number of samples per frame per channel, and the timestamp of the first SBC frame. When a SBC frame is fragmented into multiple media packets, all packets that make up a fragmented SBC frame may use the same timestamp.

The timestamps are used to play the received audio data at the right time, and should take into account the buffering time of the slaves. However, using only these timestamps does not ensure that the synchronization is good enough, even if the internal latency of each device is taken into account.

Indeed, it is also necessary that the local clocks of the sink devices are sufficiently mutually synchronized. By "sufficiently mutually synchronized", it is meant that the local clocks of the sink devices are not shifted by a delay greater than a predefined threshold (the threshold depending on the application and the ear tolerance). For instance, in the case of wireless earbuds, this delay should not exceed 40 µs.

In the case of an audio wireless system in which a point-to-multipoint link is created between a source (or master) device and a plurality of sink (or slave) devices, like the one represented in FIG. 3, one of the previous synchronization methods may be used, at the source device and/or at a sink device.

Figure 6:
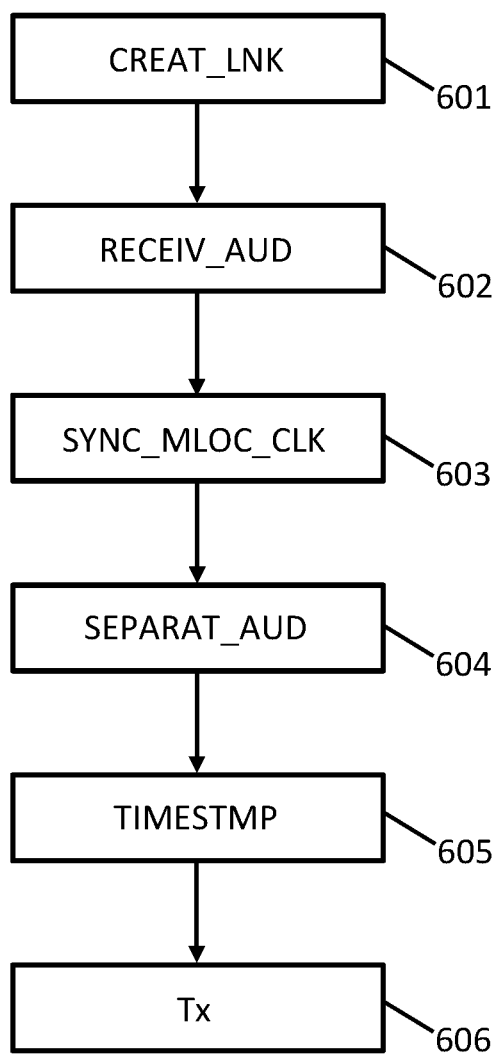
FIG. 6 is a flow chart of a method for wirelessly transmitting, by a source device, audio data to several sink devices, in a possible embodiment.

FIG. 6 is a flow chart of a method for wirelessly transmitting, by a source device, audio data to several sink devices, in a possible embodiment.

At step 601, the master device may establish a point-to-multipoint link with the plurality of sink devices (elements 303 and 304 of FIG. 3). At step 602, the master device may receive an audio stream part to be played by the sink devices. At step 603, the master may synchronize its local clock with the master timing reference of the Bluetooth piconet according to any of the synchronization methods presented above. At step 604, a plurality of packet sets may be created from the audio stream part. Each packet set may contain at least one audio packet, and each packet set may be directed to a respective sink device for the corresponding content to be played by said sink device. It is noted that steps 602, 603, 604 could be executed in different orders. For instance, the synchronization step 603 may be performed before receiving 602 the audio stream part, or after separating 604 the audio stream part into a plurality of packets.

The packets of each packet set may then be timestamped 605. Advantageously, packets that correspond to time-related audio data are identically timestamped (i.e. packets containing sound-data that should be rendered at the same time have the same timestamp, even if they are transmitted in two distinct links). For instance, a buffer on the master device may contain the audio stream part. The master device may encode the left channel for the first slave, packetize it and tag it with a first timestamp. The master device may also encode the right channel for the second slave, packetize it and tag it with the same first timestamp.

The timestamped audio packets are then transmitted 606 from the master to the proper slave, via the corresponding wireless link. For instance, the timestamped audio packets corresponding to the left channel may be sent to the first earbud via the first wireless link, and the timestamped audio packets corresponding to the right channel may be sent to the second earbud via the second wireless link.

Furthermore, the master device may periodically perform the synchronization operation 603 to compensate the drift of its local clock.

It has to be noted that the synchronization step 603 is optional. In a wireless audio system, what is really important is that the host clocks of the slaves are mutually synchronized (to play corresponding audio contents at the same time on both speakers). If the host clock of the master is not synchronized with the master timing reference of the Bluetooth piconet, there is no inconvenient impact for the user.

Figure 7:
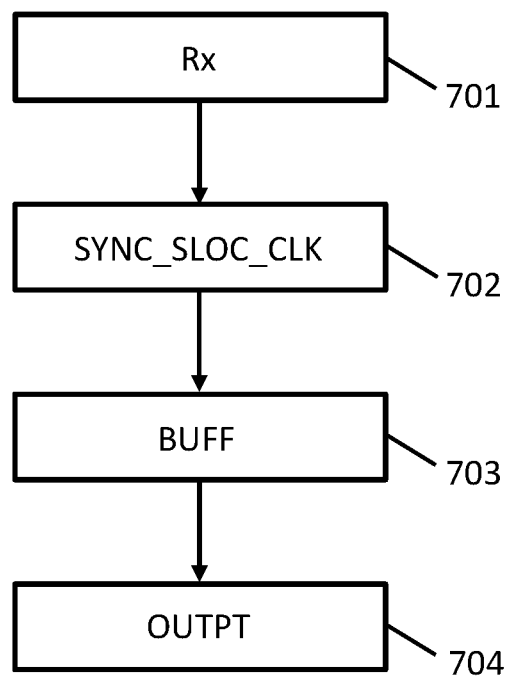
FIG. 7 is a flow chart of a method for wirelessly receiving, at a sink device, audio data from a source device, in a possible embodiment.

FIG. 7 is a flow chart of a method for wirelessly receiving, at a sink device, audio data from a source device, in a possible embodiment.

It is supposed that a link has already been established between the master and the sink device. At step 701, the sink device may receive audio data in form of timestamped encoded audio packets. At step 702, the sink device may synchronize its local clock with the master timing reference of the Bluetooth piconet according to any of the synchronization methods presented above. Of course, the synchronization 702 may be performed before the reception 701 of audio data. The sink device may further decode the received audio data, put it into a buffer (step 703) and render it (step 704) when its local clock is equal to the timestamp of the related packet.

It is noted that the steps depicted in FIG. 7 may be performed by each sink device of the piconet. Furthermore, the sink devices may periodically perform the synchronization operation 702 (for example, every one second) to compensate the drift of their local clocks (i.e. $BT_{1/2\mu s}$+LAG in case of a fixed lag time or based on any method described above). They may also use a control loop to take into account the unfixed delay introduced by the output of the sound.

The advantage of this method is that it does not require additional bandwidth for the synchronization (no additional wireless link).

When the synchronization between the slaves is based on a broadcast link (as described above, in reference to FIG. 4e), the transmission of audio data from a source device to a plurality of sink devices and the rendering of corresponding audio signals by the sink devices may be performed as follows.

After establishing the first and the second wireless links and streams and the broadcast link, the master device sends a sync broadcast packet that is used by the slaves to synchronize their local clocks. It then encodes the audio data, packetizes it, timestamps it and sends it to the slaves.

After establishing its wireless link/stream and the broadcast link with the master, each slave receives a broadcast sync packet and synchronizes its local clock accordingly. When it receives audio data, it decodes it, puts it into a buffer and outputs it when the local clock is equal to the timestamp of the related packet.

The slaves may periodically resynchronize their local clock with the source clock (for example, every one second) to compensate the drift of the local clocks over time and thus the master may periodically send a broadcast sync packet. They may also use a control loop to take into account the unfixed delay introduced by the output of the sound.

Figure 9A:
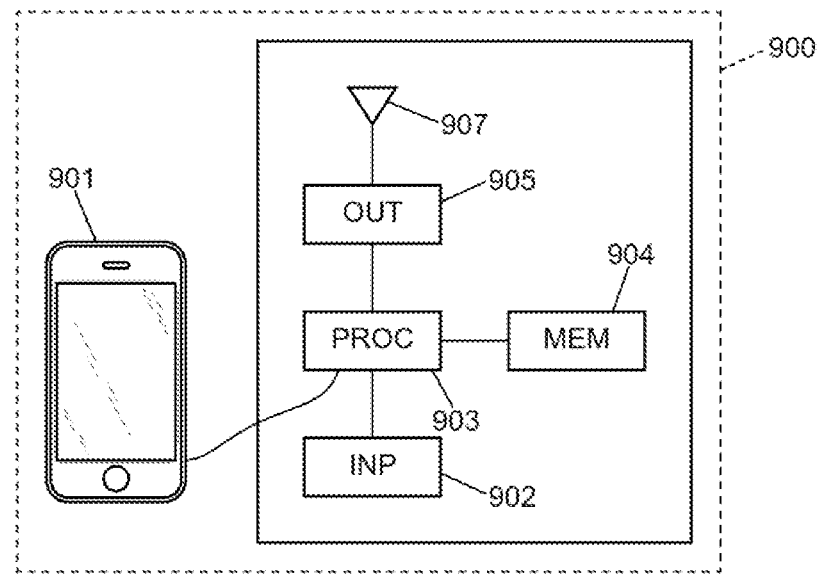
FIG. 9a represents a possible Bluetooth source device configured for performing a method for wirelessly transmitting audio data to several loudspeakers, according to an embodiment.

FIG. 9a represents a possible Bluetooth source (or "master") device configured for performing a method for wirelessly transmitting audio data to several loudspeakers, according to an embodiment.

In this embodiment, the source device 900 comprises a memory 904 to store program instructions loadable into a circuit and adapted to cause circuit 903 to carry out the steps of the present invention when the program instructions are run by the circuit 903.

The memory 904 may also store data and useful information for carrying the steps of the present invention as described above.

The circuit 903 may be for instance:
- a processor or a processing unit adapted to interpret instructions in a computer language, the processor or the processing unit may comprise, may be associated with or be attached to a memory comprising the instructions, or
- the association of a processor/processing unit and a memory, the processor or the processing unit adapted to interpret instructions in a computer language, the memory comprising said instructions, or
- an electronic card wherein the steps of the invention are described within silicon, or
- a programmable electronic chip such as a FPGA chip (for «Field-Programmable Gate Array»).

This device 900 comprises an input interface 902 for the reception of a control signal relative to audio data to be played by a loudspeaker system according to the invention and an output interface 905 (e.g. a Bluetooth interface, similar to the element 807 of FIG. 8) for transmitting audio signals to the loudspeakers via an antenna 907.

To ease the interaction with the device, the source device 900 may contain a Human Machine Interface 901 connected to the circuit 903.

Furthermore, the block diagram represented in FIG. 6 is a typical example of a program for which instructions can be executed by the source device described. FIG. 6 may thus correspond to the flowchart of the general audio transmission algorithm of a computer program within the meaning of the invention.

Figure 9B:
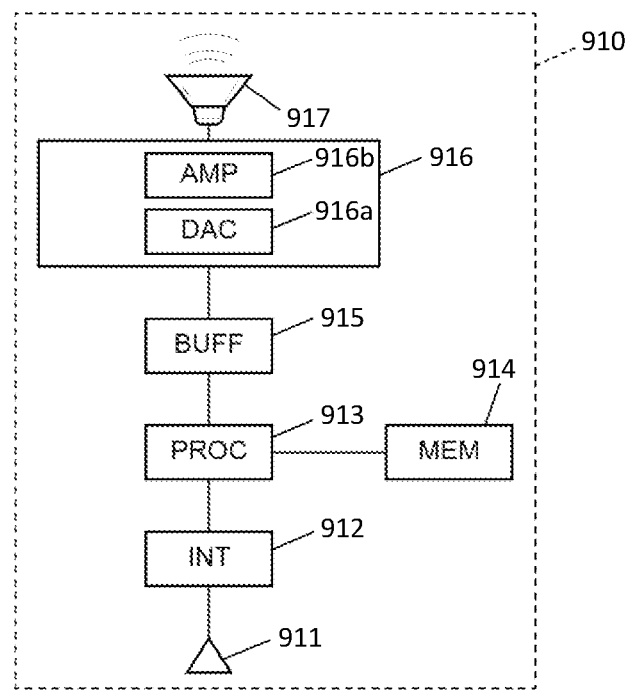
FIG. 9b represents a possible Bluetooth sink device configured for performing a method for wirelessly receiving audio data from a source device, according to an embodiment.
Figure 10:
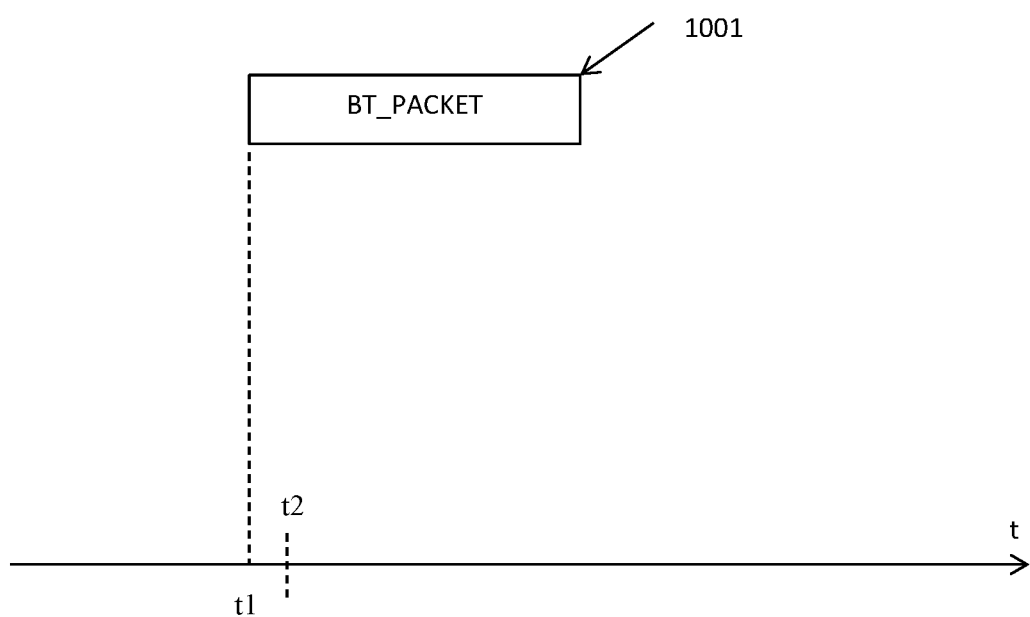
FIG. 10 is an example of resynchronization of a Bluetooth clock of a BT device.

FIG. 9b represents a possible Bluetooth sink (or "slave") device configured for performing a method for wirelessly receiving audio data from a source device, according to an embodiment.

In this embodiment, the device 910 comprises a memory 914 to store program instructions loadable into a circuit and adapted to cause circuit 913 to carry out the steps of the present invention when the program instructions are run by the circuit 913. The memory 914 may also store data and useful information for carrying the steps of the present invention as described above.

The circuit 913 may be for instance:
- a processor or a processing unit adapted to interpret instructions in a computer language, the processor or the processing unit may comprise, may be associated with or be attached to a memory comprising the instructions, or
- the association of a processor/processing unit and a memory, the processor or the processing unit adapted to interpret instructions in a computer language, the memory comprising said instructions, or
- an electronic card wherein the steps of the invention are described within silicon, or
- a programmable electronic chip such as a FPGA chip (for «Field-Programmable Gate Array»).

This device 910 comprises:
- an input wireless Bluetooth interface 912 receiving audio signals and establishing bidirectional wireless link with a source device via a Bluetooth antenna 911 according to the invention;
- an output audio circuit 916 that contains at least a digital-to-analog converter (DAC) 916a and an audio amplifier 916b;
- an audio buffer 915 to temporarily storing digitized audio before it is transferred to the audio output circuit. In one possible embodiment the buffer 915 may be included in the memory 914; and
- a loudspeaker 917 to convert the electronic signals output from the amplifier into sound.

In one embodiment, the device 910 may also comprise a microphone and a microphone input circuit for voice data transmission.

Furthermore, the block diagram represented in FIG. 7 is a typical example of a program for which instructions can be made to the sink device described. FIG. 7 may thus correspond to the flowchart of the general algorithm of a computer program within the meaning of the invention.

Of course, the present invention is not limited to the embodiments described above as examples. It extends to other variants. For example, the disclosed methods can be applied to earbud pair systems, in which audio data is sent to each pair of earphones.

Depending on the embodiment chosen, certain acts, actions, events or functions of each of the methods described herein may be performed or occur in a different order from that in which they were described, or may be added, merged or not to be performed or not to occur, as the case may be. In addition, in some embodiments, certain acts, actions or events are performed or occur concurrently and not successively.

Although described through a number of detailed exemplary embodiments, the proposed method and equipment for implementing the method includes various alternatives, modifications and improvements which will be apparent to those skilled in the art, it being understood that these various variants, modifications and improvements fall within the scope of the invention, as defined by the following claims. In addition, various aspects and features described above may be implemented together, or separately, or substituted for each other, and all of the various combinations and sub-combinations of aspects and features are within the scope of the invention. In addition, some of the systems and equipment described above may not incorporate all of the modules and features described for the preferred embodiments.

It is noted that a "local clock" may be replaced with "host clock" in the above description.

What is claimed is:

1. A method for synchronizing a host system of a Bluetooth device of a Bluetooth piconet with a timing reference of a master device of the Bluetooth piconet, said host system supporting a host stack of a Bluetooth protocol, and said Bluetooth device including a controller supporting a controller stack of the Bluetooth protocol, wherein the method comprises:
   receiving, at the controller, a piconet-synchronized signal;
   providing, by the controller to the host system, a derivative of the piconet-synchronized signal;
   computing, by the host system, a latency of the providing; and
   synchronizing, at the host system of the Bluetooth device, a host clock with the timing reference of the master device of the Bluetooth piconet using said latency and the derivative of the piconet-synchronized signal;
   wherein the derivative of the piconet-synchronized signal is provided via an interface between the host system and the controller.

2. The method of claim 1, wherein the latency is determined based on a predetermined value associated with the Bluetooth device.

3. The method of claim 2, wherein the providing uses a synchronous message, a time of transmission of said synchronous message corresponds to said predetermined value.

4. The method of claim 1, wherein the method further comprises, before the providing:
   reading the derivative of the piconet-synchronized signal;
   upon said reading, sending, by the controller to the host system a second synchronous message;
   upon receiving said second synchronous message, reading by the host system the value of the host clock; and
   wherein the latency is determined based on the second synchronous message.

5. The method of claim 4 wherein the latency is further determined based on a time of transmission of said second synchronous message.

6. The method of claim 1, further comprising:
   determining, at the controller of the Bluetooth device, a value function of a device Bluetooth clock based on when the piconet-synchronized signal is received;
   wherein the value function of the device Bluetooth clock is the derivative of the piconet-synchronized signal; and
   wherein the providing comprises providing the value function of the device Bluetooth clock to the host system.

7. The method of claim 6, wherein the providing comprises:
   reading, by the controller, a value of the value function of the device Bluetooth clock; and
   sending from the controller, to the host system, the value of the value function of the device Bluetooth clock.

8. The method of claim 1, further comprising:
   receiving, at the controller of the Bluetooth device, a second piconet-synchronized signal;
   providing, by the controller to the host system, the second piconet-synchronized signal; and
   wherein the synchronizing is based on a first counter in the piconet-synchronized signal and a second counter in the second piconet-synchronized signal.

9. The method of claim 8, wherein the piconet-synchronized signal and the second piconet-synchronized signal are broadcast on an Active Slave Broadcast transport of the Bluetooth Piconet.

10. The method of claim 1, wherein the host system and controller run on the same processor.

11. The method of claim 1, wherein the host system and controller run on two separate processors.

12. A Bluetooth device of a Bluetooth piconet, said Bluetooth device comprising a host system and a controller, said host system supporting a host stack of a Bluetooth protocol, and the controller supporting a controller stack of the Bluetooth protocol, wherein the Bluetooth device comprises:
an interface for receiving, at the controller, a piconet-synchronized signal;
an interface for providing, by the controller to the host system, a derivative of the piconet-synchronized signal;
a circuit for computing, by the host system, a latency of the providing; and
a circuit for synchronizing, at the host system of the Bluetooth device, a host clock with a timing reference of a master device of the Bluetooth piconet using said latency and the derivative of the piconet-synchronized signal;
wherein the derivative of the piconet-synchronized signal is provided via an interface between the host system and the controller.

13. The Bluetooth device of claim 12, wherein the latency is determined based on a predetermined value associated with the Bluetooth device.

14. The Bluetooth device of claim 12, wherein the host system and controller run on the same processor.

15. The Bluetooth device of claim 12, wherein the host system and controller run on two separate processors.

16. A non-transitory computer readable storage medium, having stored thereon a computer program comprising program instructions, the computer program being loadable into a data-processing unit and adapted to cause the data-processing unit to carry out steps of a method for synchronizing a host system of a Bluetooth device of a Bluetooth piconet with a timing reference of a master device of the Bluetooth piconet, when the computer program is run by the data-processing unit, said host system supporting a host stack of a Bluetooth protocol, and said Bluetooth device including a controller supporting a controller stack of the Bluetooth protocol, wherein the method comprises:
receiving, at the controller, a piconet-synchronized signal;
providing, by the controller to the host system, a derivative of the piconet-synchronized signal;
computing, by the host system, a latency of the providing; and
synchronizing, at the host system of the Bluetooth device, a host clock with the timing reference of the master device of the Bluetooth piconet using said latency and the derivative of the piconet-synchronized signal;
wherein the derivative of the piconet-synchronized signal is provided via an interface between the host system and the controller.

17. The non-transitory computer readable storage medium of claim 16, wherein the latency is determined based on a predetermined value associated with the Bluetooth device.

18. The non-transitory computer readable storage medium of claim 16, wherein the host system and controller run on the same processor.

19. The non-transitory computer readable storage medium of claim 16, wherein the host system and controller run on two separate processors.

20. A method for rendering audio signals, the method being performed by a Bluetooth audio sink device configured to be wirelessly connected to a Bluetooth master device, the Bluetooth audio sink device comprising a host system supporting a host stack of a Bluetooth protocol and a controller supporting a controller stack of the Bluetooth protocol, the method comprising:
synchronizing a host clock of the Bluetooth audio sink device with a master timing reference by:
(i) receiving, at the controller, a piconet-synchronized signal;
(ii) providing, by the controller to the host system, a derivative of the piconet-synchronized signal;
(iii) computing, by the host system, a latency of the providing; and
(iv) synchronizing, at the host system of the Bluetooth audio sink device, the host clock with the master timing reference using said latency and the derivative of the piconet-synchronized signal;
receiving at least one timestamped packet on a dedicated link established between the sink device and the Bluetooth master device; and
rendering an audio signal based on the at least one timestamped packet and on the synchronized host clock of the Bluetooth audio sink device;
wherein the derivative of the piconet-synchronized signal is provided via an interface between the host system and the controller.

21. The method of claim 20, wherein said at least one timestamped packet contains mono audio data relative to a single audio channel.

22. The method of claim 20, wherein the latency is determined based on a predetermined value associated with the Bluetooth audio sink device.

23. The method of claim 20, wherein the host system and controller run on the same processor.

24. The method of claim 20, wherein the host system and controller run on two separate processors.

25. A Bluetooth audio sink device comprising a host system supporting a host stack of a Bluetooth protocol and a controller supporting a controller stack of the Bluetooth protocol, the Bluetooth audio sink device comprising:
a circuit for being wirelessly connected to a Bluetooth master device;
a circuit for synchronizing a host clock of the Bluetooth audio sink device by:
(i) receiving, at the controller, a piconet-synchronized signal;
(ii) providing, by the controller to the host system, a derivative of the piconet-synchronized signal;
(iii) computing, by the host system, a latency of the providing; and
(iv) synchronizing, at the host system of the Bluetooth audio sink device, the host clock with a master timing reference using said latency and the derivative of the piconet-synchronized signal;
an interface for receiving at least one timestamped packet on a dedicated link established between the sink device and the Bluetooth master device; and
an output for rendering an audio signal based on the at least one timestamped packet and on the synchronized host clock of the Bluetooth audio sink device;
wherein the derivative of the piconet-synchronized signal is provided via an interface between the host system and the controller.

26. The Bluetooth audio sink device of claim 25, wherein the latency is determined based on a predetermined value associated with the Bluetooth audio sink device.

27. The Bluetooth audio sink device of claim 25, wherein the host system and controller run on the same processor.

28. The Bluetooth audio sink device of claim 25, wherein the host system and controller run on two separate processors.

29. A non-transitory computer readable storage medium, having stored thereon a computer program comprising program instructions, the computer program being loadable into a data-processing unit and adapted to cause the data-processing unit to carry out a method for rendering audio signals, the method being performed by a Bluetooth audio sink device configured to be wirelessly connected to a Bluetooth master device, the Bluetooth audio sink device comprising a host system supporting a host stack of a Bluetooth protocol and a controller supporting a controller stack of the Bluetooth protocol, when the computer program is run by the data-processing unit, the method comprising:

synchronizing a host clock of the Bluetooth audio sink device with a master timing reference by:
(i) receiving, at the controller, a piconet-synchronized signal;
(ii) providing, by the controller to the host system, a derivative of the piconet-synchronized signal;
(iii) computing, by the host system, a latency of the providing; and
(iv) synchronizing, at the host system of the Bluetooth audio sink device, the host clock with the master timing reference using said latency and the derivative of the piconet-synchronized signal;

receiving at least one timestamped packet on a dedicated link established between the Bluetooth audio sink device and the Bluetooth master device; and rendering an audio signal based on the at least one timestamped packet and on the synchronized host clock of the Bluetooth audio sink device;

wherein the derivative of the piconet-synchronized signal is provided via an interface between the host system and the controller.

30. The non-transitory computer readable storage medium of claim 29, wherein the latency is determined based on a predetermined value associated with the Bluetooth audio sink device.

31. The non-transitory computer readable storage medium of claim 29, wherein the host system and controller run on the same processor.

32. The non-transitory computer readable storage medium of claim 29, wherein the host system and controller run on two separate processors.

* * * * *